(12) United States Patent
Krantz

(10) Patent No.: US 6,248,988 B1
(45) Date of Patent: Jun. 19, 2001

(54) CONVENTIONAL AND CONFOCAL MULTI-SPOT SCANNING OPTICAL MICROSCOPE

(75) Inventor: Matthias C. Krantz, Aptos, CA (US)

(73) Assignee: KLA-Tencor Corporation, San Jose, CA (US)

( * ) Notice: Subject to any disclaimer, the term of this patent is extended or adjusted under 35 U.S.C. 154(b) by 0 days.

(21) Appl. No.: 09/073,110

(22) Filed: May 5, 1998

(51) Int. Cl.⁷ .............................. G02B 7/04; G02B 27/40
(52) U.S. Cl. ..................... 250/201.3; 250/234; 359/385
(58) Field of Search ................................ 250/201.3, 202, 250/227.26, 229, 216, 208.1, 234–236; 362/321, 348; 359/368, 385, 386–389

(56) References Cited

U.S. PATENT DOCUMENTS

| | | | |
|---|---|---|---|
| 3,013,467 | 12/1961 | Minsky | 88/14 |
| 4,509,826 | 4/1985 | Araghi | 350/286 |
| 4,802,748 | 2/1989 | McCarthy et al. | 350/507 |
| 4,927,254 | 5/1990 | Kino et al. | 350/507 |
| 5,065,008 | 11/1991 | Hakamata et al. | 250/216 |
| 5,067,805 | 11/1991 | Corle et al. | 359/235 |
| 5,081,349 | 1/1992 | Iwasaki | 250/234 |

(List continued on next page.)

OTHER PUBLICATIONS

D.L. Dickensheets et al., "A micromachined confocal optical microscope", SPIE, vol. 2655, pp. 79–85 (1996).

H.J. Tiziani et al., "Chromatic confocal microscopy with micro–lenses", *Journal of Modern Optics*, vol. 43, No. 1, pp. 155–163, (1996).

R. Juskaitis et al., "Efficient real–time confocal microscopy with white light sources", *Nature*, vol. 383, Oct. 31, 1996, pp. 804–806.

T. Wilson et al., "Confocal microscopy by aperture correlation", *Optics Letters*, vol. 21, No. 23, Dec. 1, 1996, pp. 1879–1881.

L. Giniunas et al., "Scanning Fibre–Optic Microscope", *Electronics Letters*, vol. 27, No. 9, Apr. 25, 1991, pp. 724–726.

Tim Dabbs et al., "Fiber–optic confocal microscope: FOCON", *Applied Optics*, vol. 31, No. 16, Jun. 1, 1992, pp. 3030–3035.

P. Torok et al., "Dark–field and differential phase contrast imaging modes in confocal microscopy using a half–aperture stop", *Optik*, 103, No. 3 (1996), pp. 101–106.

C. Sheppard et al., "Image formation in confocal optical systems", *SPIE*, vol. 232 (1980), pp. 197–202.

*Primary Examiner*—Stephone B. Allen
(74) *Attorney, Agent, or Firm*—Conley, Rose & Tayon, PC; Eric B. Meyertons

(57) ABSTRACT

A multispot scanning optical microscope image acquisition system for confocal and conventional imaging, metrology, real-time viewing, inspection and review of an object features an array of multiple separate focused light spots illuminating the object and a corresponding array detector detecting light from the object for each separate spot. Scanning the relative positions of the array and object at a slight angle to the rows of the spots allows an entire field of the object to be successively illuminated and imaged in a swath of pixels. The scan speed and detector readout direction and speed are coordinated to provide precise registration of adjacent pixels despite delayed acquisition by the adjacent columns of light spots and detector elements. The detector elements are sized and spaced apart to minimize crosstalk for confocal imaging and the illuminating spots can likewise be apodized to minimize sidelobe noise.

158 Claims, 12 Drawing Sheets

U.S. PATENT DOCUMENTS

| | | | |
|---|---|---|---|
| 5,248,876 * | 9/1993 | Kerstens et al. | 250/201.3 |
| 5,452,090 | 9/1995 | Progler et al. | 356/401 |
| 5,532,874 | 7/1996 | Stein | 359/394 |
| 5,557,452 | 9/1996 | Harris | 359/368 |
| 5,563,702 | 10/1996 | Emery et al. | 356/73 |
| 5,586,058 | 12/1996 | Aloni et al. | 364/552 |
| 5,587,832 | 12/1996 | Krause | 359/385 |
| 5,594,235 | 1/1997 | Lee | 250/201.3 |
| 5,612,818 | 3/1997 | Kumagai et al. | 359/385 |
| 5,737,084 | 4/1998 | Ishihara . | |

* cited by examiner

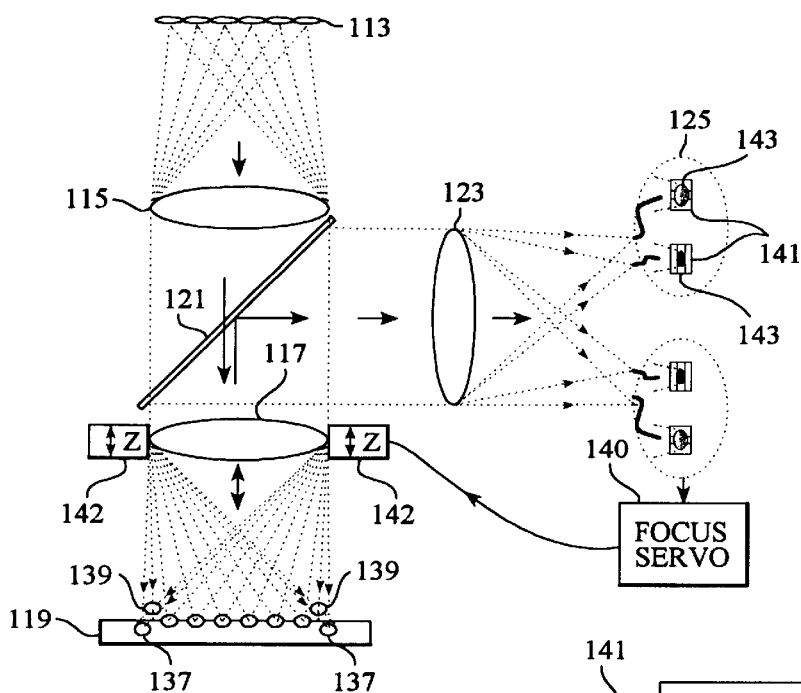
FIG. 5
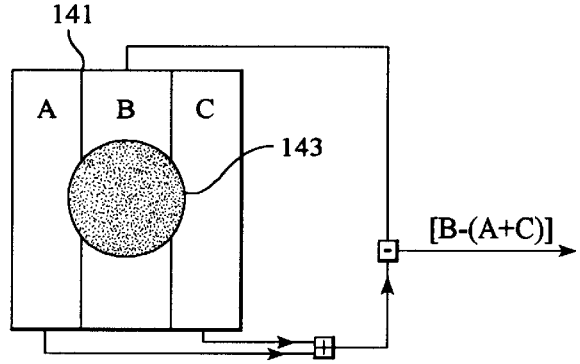
FIG. 6
FIG. 9
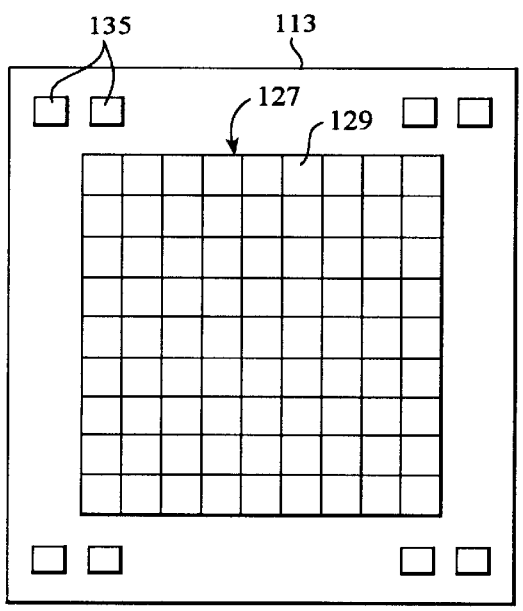
FIG. 7
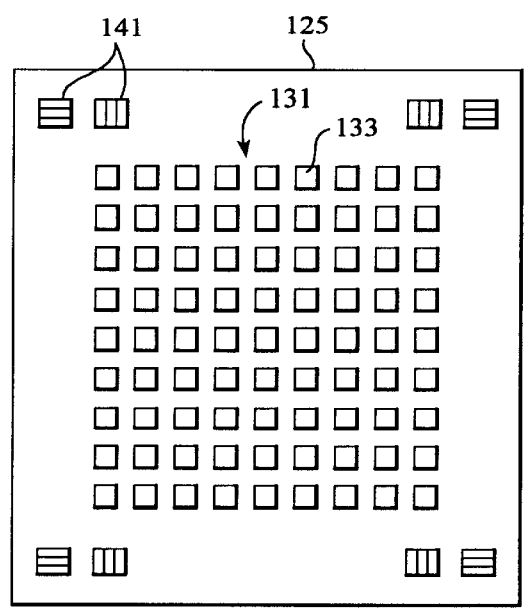
FIG. 8

CONVENTIONAL AND CONFOCAL MULTI-SPOT SCANNING OPTICAL MICROSCOPE

TECHNICAL FIELD

The present invention relates to scanning optical microscope systems of both the conventional and confocal type, and specifically to the architecture of both the illumination and detection optics of such systems. The invention furthermore addresses the efficiency of such systems and their high speed inspection and 2- or 3-dimensional viewing and imaging capabilities.

BACKGROUND ART

Microscope systems may be used for automated inspection of patterned objects, such as photomasks or silicon wafers, for detecting defects or particles. Key requirements for automated inspection systems include high resolution, high contrast imaging for defect detection sensitivity, and high speed or throughput. The ever shrinking (now submicron) critical dimension on these objects require higher resolution to detect the critical defects or particles that are a fraction of the feature size. Shorter wavelengths and higher numerical aperture optics are needed to produce the required resolution. These shrinking feature sizes also result in a strong increase in the number of pixels per photomask that need to be processed in a short time, thus driving up the data rates at which the images have to be acquired. As a result, different systems have evolved for high speed photomask inspection, defect review, aerial imaging (i.e., the exact matching of imaging parameters used in a wafer stepper) and special applications like phase defect detection.

Imaging systems can be classified as projection systems or as scanners. Projection system architectures for high speed photomask imaging with lamp-based area illumination and either CCD or TDI (time delay integration) array detectors are limited both by the relatively low brightness of available light sources and the aberrations of the high numerical aperture (N.A.) wide band and wide field optics needed for high resolution imaging. If a laser illumination system is used, the coherence of the laser produces speckle and contributes image noise which needs to be controlled. Both lamp and laser illumination based projection systems are subject to the data rate, signal-to-noise ratio, modulation transfer function, and quantum efficiency limitations of the array detector. The object being imaged is either stepped across the field of the object until the image is acquired or moved continuously using a TDI array detector, which sacrifices some resolution due to image smearing. Moreover, these projector-type optical imaging systems make it both costly and difficult to derive multiple types of images (e.g., transmitted and reflected, brightfield and darkfield, phase contrast, and differential interference contrast (Nomarski) imaging) simultaneously from the same object by means of multiple detector arrays and electronic processing, since each new signal requires an additional expensive array detector and the maintaining of perfect pixel alignment of the multiple array detectors in the presence of vibrations and lens distortions. Laser scanning architectures using a single spot for high speed imaging are limited by the achievable data rates of acousto-optic scanners, thermal damage to the objects and the availability and reliability of cw lasers at short wavelengths.

Confocal microscope systems provide higher resolution than conventional microscopes. In U.S. Pat. No. 3,013,467, Minsky describes the basic principle of confocal microscopy. The confocal microscope includes a point light source which is focused as a spot onto an object for illumination. The emerging (e.g., reflected or transmitted) light from the object is, in turn, imaged onto a point detector and the image is obtained by scanning. The higher resolution is a result of the point source illumination as compared to uniform illumination in a conventional microscope. In addition to its greater resolution than conventional microscopes, the confocal microscope provides depth discrimination that can be used to obtain three-dimensional images from two-dimensional slices by superposition of the image data obtained at different focal depths. This makes confocal microscopy useful, not only for inspecting photomasks and other patterned objects for defects, but also for imaging biological and other low contrast or light scattering three-dimensional objects, e.g. to observe living cells. Confocal illumination and imaging requires scanning of each point in the field in order to construct a viewable image, whereby the illumination and imaging pinholes are aligned in conjugate positions and maintained in such alignment. Most confocal microscopes use sequential acquisition of single image points in a self-aligned optical scheme in order to avoid the inherent alignment problems. For example, Minsky uses a stage scanning system that moves the object relative to a fixed illumination and imaged point, while producing a synchronized identical scanning pattern on a display device that receives the point detection signal. Alternatively, U.S. Pat. No. 4,802,748 to McCarthy et al. teaches the use of a rotating pinhole (Nipkow) disk for the source and exit pinholes in order to concurrently scan the illumination and imaged spot over the object field. U.S. Pat. No. 4,927,254 to Kino et al. also uses rotating disks. Alternatively, one could raster scan a laser beam with rotating mirrors, as in U.S. Pat. No. 5,065,008 to Hakamata et al., U.S. Pat. No. 5,081,349 to Iwasaki, and as described by D. L. Dickensheets, in SPIE, vol. 2655, pages 79–85 (1996). One might also use an acousto-optic cell for spot scanning of the object. However, each of these single spot confocal scanning schemes is limited by the achievable scanning speed and possible scan aberrations. Moreover, such confocal systems either have low illumination brightness, which lengthens image acquisition times, or are limited by the potential thermal damage to an object caused by higher brightness laser sources. Laser scanning architectures are also limited by the availability of CW lasers at short (UV) wavelengths.

The above-described projection systems and high speed scanners typically do not have aerial imaging capabilities (i.e., exactly matching the imaging parameters of the wafer stepper) and defect review, and aerial imaging microscopes do not have high data rates. High resolution imaging from confocal microscopes is not available at the high data rates and high signal-to-noise ratios required for photomask inspection.

One improvement in confocal microscope systems is taught by Krause in U.S. Pat. No. 5,587,832. Krause uses an electronically addressed spatial light modulator, such as an electrostatic microshutter array or a digital mirror device (DMD) with an array of mirror-coated shutters, to produce sequential patterns of multiple, simultaneously formed, illumination spots on the object. Krause further provides means, whether it be the same spatial light modulator, or an active pixel sensor (APS) type of array detector, for masking selected pixels of an image detector array in correlation with the illumination spot pattern so that different subsets of the image corresponding to the patterns are sequentially sensed by the detector array. An image processor stores and combines the signals to form a complete frame. One limitation of such a system is provided by the digital mirror device (DMD) or other spatial light modulator. The need to produce acceptable yields of DMDs with a large number of pixel elements without a single defect limits the practical size of a DMD to about 106 pixels, each about 10 to 15 µm in size. Detector efficiency limitations require a frame time of at least 10–20 µsec, while both DMD and detector mask addressing speeds further limit the achievable data rate. Nevertheless, the multispot illumination and detection described by Krause, in principle offers higher image acquisition efficiency than single spot scanning. In order to avoid crosstalk noise in the confocal image, the illumination and detection patterns need to be selected properly. Also, the shutter arrays have to be closed for detector readout between the successive patterns, further slowing confocal image acquisition.

Tiziani et al., in *J. Mod. Opt.* 43, 155 (1996) disclose a chromatic confocal microscope using a microlens array objective producing multiple confocal imaging spots on a CCD detector and is intended for topometry. However, for imaging purposes this approach is limited by the optical performance of the microlens array, in particular the numerical aperture (NA)—aberration tradeoff preventing small spot sizes for high resolution, the limited working distance at large NA, and insufficient sample compared to Nyquist's theorem.

Juskaitis et al., in *Nature*, 383, 804–806 (1996), disclose another confocal microscope using an addressed spatial light modulator to provide aperture correlation. The spatial light modulator is a closely spaced addressable pinhole array, wherein the pixel transmittances are programmed with different uncorrelated sequences to yield the sum of confocal and conventional image. A conventional image must also be acquired for subtraction to obtain the confocal image. Like the Krause system, this modulator-type microscope is limited by the number of pixels and bandwidth limitations of available spatial light modulators.

It is an object of the present invention to provide a high resolution, high efficiency, high speed confocal and conventional microscope imaging system suitable for defect inspection and review, particularly one whose architecture is scalable to smaller pixel size, and greater field size and data rates.

DISCLOSURE OF THE INVENTION

The above objects are met by an optical microscope system that comprises a spot array illumination system having a microlens array or pinhole array (or both) for producing an array of multiple separate focused light spots illuminating an object, an imaging and detecting system including an array detector with detection elements arranged to simultaneously detect light for each spot imaged from the illuminated object, means for scanning the position of the array of separate spots relative to the object sampling each pixel to acquire an image of an entire field of the object in a connected swath. A processor constructs the image from the pixel data successively received by the detector array. This novel microscope architecture does not require any spatial light modulator, so the data rate is not limited by the modulation rate of such a modulator, but now is limited only by the much higher read-out rate of the array detector.

The illumination may be apodized, for example by means of a pinhole array located at a focal plane of the lens array that produces the light spots and by underfilling the objective lens, so that sidelobes of the light spots are substantially reduced and crosstalk between adjacent spots is minimized. This enables a laser light source to be used without introducing speckle and the number of spots in the field is maximized. For confocal imaging, the detector elements of the array detector have a smaller size relative to their spacing such that each element only receives light from the center of the point spread function of the imaging optics.

In combination with a scan direction that is at a slight angle to the rows of light spots, an entire field in a connected swath of pixels can be imaged. The spot array induced acquisition time delays between adjacent pixels can be compensated for by the readout sequence of the detector array or by adjusting the scan speed relative to the readout rate of the detector array to produce perfectly registered images. Scanning may be carried out either by moving a stage holding the object or by moving the array of beams. Use of an acousto-optic chirp cell to move the array of beams is especially beneficial in a review mode.

This multispot microscope system is adaptable to a number of possible imaging modes, including both conventional and confocal imaging, transmissive and reflective viewing, phase contrast imaging, 3-dimensional imaging and others. Multiple simultaneous images can be obtained with different detectors. Because of the multispot illumination, registration of the different array detectors is simplified. Autofocusing, as well as focal depth scanning can also be implemented, for example with piezo-electric positioning of the microscope objective.

BRIEF DESCRIPTION OF THE DRAWINGS

FIGS. 5–9 illustrate an autofocus scheme for a microscope system of the present invention.

FIG. 5 is a schematic plan view of the overall autofocus optics,

FIG. 6 are enlarged plan views of the light spots used for autofocus at the array detector, FIGS. 7 and 8 are respective plan views of the lens array and array detector with spot size sensing autofocus elements at the corners, and FIG. 9 is a schematic diagram showing electronic processing of the autofocus detector signals.

BEST MODE OF CARRYING OUT THE INVENTION

Figure 1:
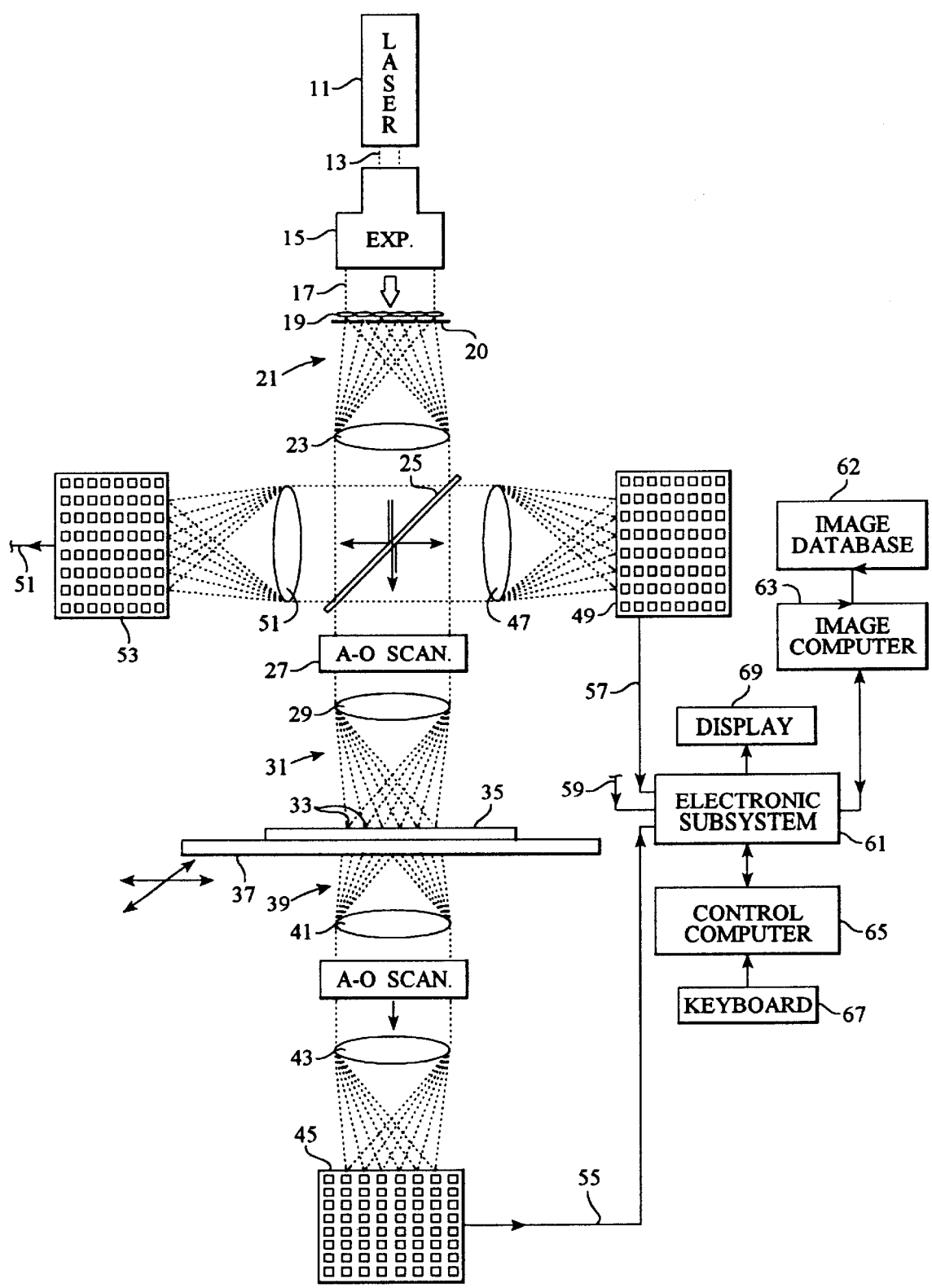
FIG. 1 is a schematic side plan view of an optical scanning microscope system of the present invention with multispot illumination and imaging.

With reference to FIG. 1, a confocal or conventional optical microscope system of the present invention includes a bright light source, such as a CW (or pulsed) laser 11 producing a light beam 13 that is expanded and collimated by a beam expander 15. The beam expander design preferably yields a uniform intensity beam profile from its exit pupil without reducing the efficiency of the illumination system too much. For photomask inspection, the laser preferably operates at the shortest possible wavelength for highest resolution, e.g. at 248 nm or 193 nm, and has stable output power (or stable pulse energy and pulse rate), a stable transverse mode and stable beam pointing.

The uniform, expanded and collimated beam 17 is directed through a microlens array 19, which divides the light beam 17 into multiple individual beamlets 21 according to the number of lenslets in the array 19, generating a two-dimensional array of spots at its focal plane. With uniform illumination, each lens element produces an Airy-type point spread function (PSF) at its focal plane. A two-dimensional pinhole array 20 is placed at the focal plane of the microlens array 19 for suppression of sidelobes. The separate individual apodized beamlets transmitted through the pinholes of the array 20 are incident on a collimation lens 23, which produces an angular array of collimated beams at its exit pupil. For best apodization results, the collimation lens 23 needs to be underfilled with less than $e^{-2}$ truncation. The apodization technique provided by the pinhole array 20 and collimation lens 23 will be discussed further below with reference to FIGS. 3 and 4.

The angular array of collimated beams from the collimation lens 23 is split at a beamsplitter 25, with the reflected path having each beam focused by the reference objective lens 51 onto a different active element of a reference light detector array 53, and with the transmitted path from the beamsplitter 25 propagating to the entrance pupil of the objective lens 29. (An optional acousto-optic beam scanning cell 27 may also be present in the collimated path between the beamsplitter 25 and objective lens 29 to provide spot array scanning of the beams over a field of the object 35.) The objective lens 29 focuses the angular beam array 31 to an array of separate light spots 33 with reduced sidelobes in a focal plane on the object 35 to be imaged. The objective lens 29 is designed for operation in the ultra-violet wavelengths, desirably has high numerical aperture for high resolution imaging, has a large flat field, is corrected against various wavefront aberrations, has high throughput, low stray light, no ghosts, a large working distance, and is telecentric in object space for metrology purposes. Shafer et al. in U.S. Pat. Nos. 5,031,976; 5,488,229; and 5,717,518 disclose catadioptric objective lens designs for broadband UV operation. For single wavelength operation, as in the laser illuminated embodiments preferred for the present invention, a high quality dioptric lens design consisting of multiple planoconvex, meniscus and biconvex elements to distribute the refractive power will suffice. The focal plane for the light spots 33 may be located at the surface of the object 35 or at some depth below the surface, as desired. The focal plane can be moved to various focal depth positions in order to construct three-dimensional images of the object or of some feature of interest on or within the object.

The illuminated spots 33 on the object may be imaged either by reflection or by transmission or both. For a photomask the imaging plane is the chrome pattern and the vital reflected light information (e.g. the presence of contamination or defects) is collected from the top surface. In a reflective mode, the reflected light 31 from each spot is collected by the objective lens 29, is reflected by the beamsplitter 25 and imaged by a second lens 47 onto detector array 49. In a transmissive mode, the transmitted light 39 from the spots 33 may be collimated by a first lens 41 and focused onto a detector array 45 by a second lens 43. Other lens combinations could also be used. The transmitted optical path is similar to the reflected optical path except for the photomask substrate and the autofocus system. The light transmitted through the object from the spot array is collimated by the objective and imaged on the transmitted light array detector. In addition to having the properties of the reflected light objective, the transmitted light objective is designed to provide high resolution imaging in the presence of thick photomask substrates. This requires insertion of blank substrates of varying thickness or a continuously thickness adjustable one similar to a Babinet compensator to approximate the design substrate thickness of the objective. Uncompensated plate thickness variations will primarily result in spherical aberration which produces crosstalk. The illumination light beams 21 can also be sampled for a comparative reference by reflection from the beamsplitter 25 and focusing by a lens 51 onto yet another detector array 53 for light calibration. Each of the one or more array detectors 45, 49 and 53 has multiple detector elements corresponding in number and relative position to the array of light spots 33 illuminating the sample 35. Light calibration is particularly important for removing illumination-, detector dark-, and photoresponse-nonuniformities and nonlinearities from the images.

Image pixel data is transmitted by the array detectors 45, 49 and 53 along bus lines 55, 57 and 59 to an electronic processing subsystem 61. The processing system 61 constructs an image of the object 35 from the pixel data with the help of an image computer 63 with its image database 62. The control computer 65 controls illumination levels by the laser 11, scanning by the stage 37 or acousto-optic cell 27 (or both), and detector readout, as well as processing of the image data by the electronic subsystem 61. The control computer 65 can receive user instructions from a keyboard 67 or other input device. The database 62 stores image data both as it is received before processing and after processing, as well as other processing results, such as identified defect or particle locations, sizes and types for photomask and wafer inspection. It may also store defect and particle identifying and classifying criteria for use by the processor 61. The processed images and other data may be displayed on a display unit 69.

The object 35 may be supported upon a movable stage 37. Scanning of the object 35 can thus be accomplished by moving the stage 37 and the object 35 with it at a constant velocity and a precise angle with respect to the spot array 33. Alternatively, the spot array 33 may be scanned over a stationary object using the acousto-optic cell 27 in the collimated beam path, or a combination of both scanning techniques could be used. What matters is that the relative positions of the array of spots 33 and the object 35 be scanned quickly, thereby being subjected to minimal image blurring from vibrations. Typically, mechanical stage scanning would be used in an inspection mode for rapidly acquiring an image of an entire photomask or wafer (or a relevant field thereof), while acousto-optic scanning would be used in a review mode for creating images of specified features of interest discovered during the inspection mode. Other scanning schemes, such as those employing rotating polygon mirrors, might also be used.

Figure 2A:
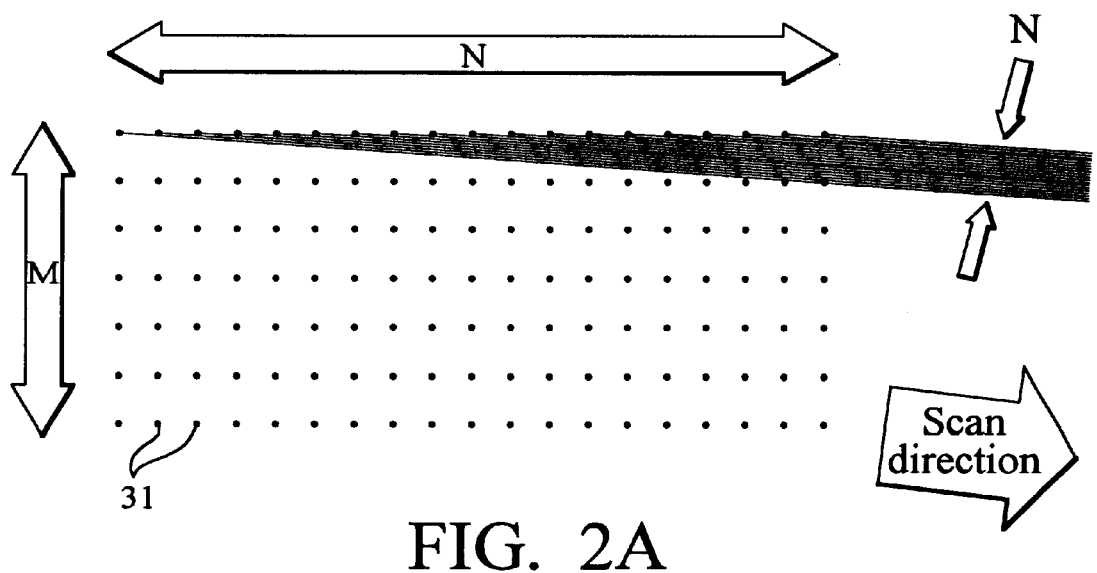
FIGS. 2A and 2B are respective top plan views of an N×M array of light spots on an object to be imaged and of a corresponding N×M array detector, illustrating an angled scan direction for scanning a connected swath of pixels in the object field and corresponding readout of the acquired pixel image data.
Figure 2B:
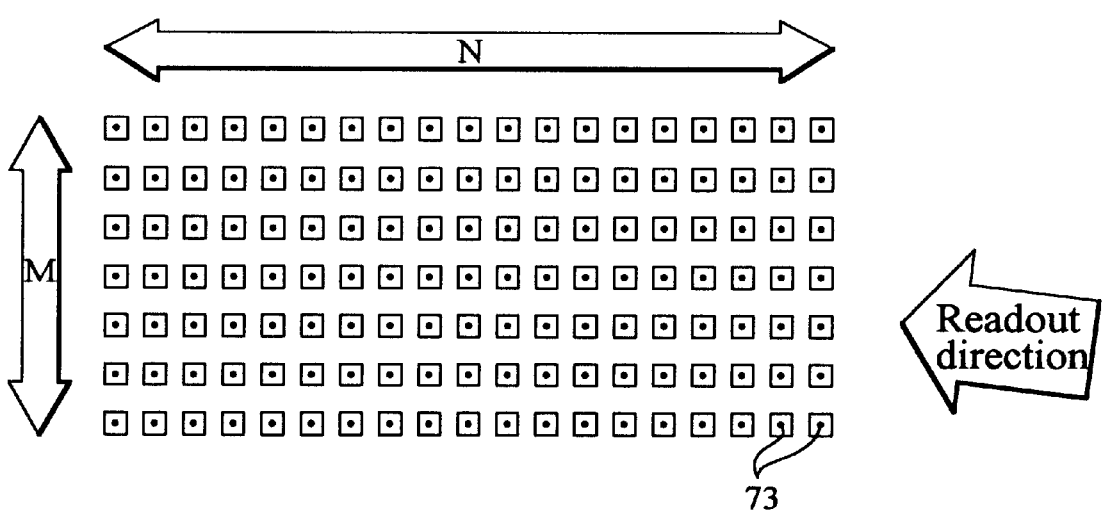

Referring now to FIGS. 2A and 2B, an N×M array of light spots 31 with maximized spot density according to the acceptable sidelobe noise is produced on the object to be imaged. This is opposed to the arc illumination of conventional microscopes and the single spot illumination of most scanning confocal microscopes. The array may be a rectangular array, as shown, or could be a hexagonal array (the columns aligned 60° instead of 90° from the rows, nonuniform sampling) for maximum packing density at a given spot separation. The spot array is complete and constant in time. No spatial light modulator producing different array patterns is needed.

In order to sequentially cover an entire field of the object with illumination, the relative positions of the spot array and object can be scanned at a slight angle, as shown. Assuming N columns of light spots in the array and equal spacing for rows and columns of light spots, the angle θ of the scan directions relative to the rows of light spots should be equal to $$\theta = \arctan[1/(N-1)].$$

For example, for N=32, the scan direction will be 1.848° from the row direction. This results in a column of N pixels on the object for every row of light spots, as indicated by the paths 71 of the first row of N spots in FIG. 2A. As a result, connected swaths of pixels are illuminated by the rows of light spots. When read out by a detector array and adjacent pixels registered, the final constructed image will cover an entire field of the object.

The spot separation determines the required number of spots in scan direction to obtain a given sampling of the image. It also controls the image noise from interfering sidelobes of adjacent spots, the required spot placement accuracy and lens distortion specification, and the minimum data rate required to avoid image noise from mechanical vibrations. Closely spaced spots lead to increased sidelobe noise in the image while greater spot separation requires more spots which increases the time delay between acquisition of certain pixels thus making the image more susceptible to noise from vibrations.

The pixel size and the sampling determine the required spot size as:

$$SP = 4.88 \times NY \times PIX$$

where SP, NY, and PIX denote the spot size, the fraction of Nyquist sampling, and the pixel size respectively. Thus, for sampling at the Nyquist rate and 100 nm pixel size, one needs a spot size of 488 nm.

As already noted, the number of spots N in the scan direction determine the scan angle θ of the image with respect to the spot array, as: $\theta = \arctan[1/(N-1)]$, whereby the value N is given by the spot separation d and the sampling, as $N = d \times \cos\theta/(PIX \times NY)$. The minimum spot separation d is determined by the sidelobe noise in the image, as discussed below with reference to FIGS. 10A and 10B. Spot separations less than 10 gm (e.g., about 3 $\mu$m) are typical. A typical array may have 1024 light spots arranged in a 32×32 grid. The number M of rows of spots perpendicular to the scan direction is limited by the field size of the objective and the spot placement errors of the lens array and the pinhole array. The number of rows M can be scaled to as many as 1024 rows or more. The need for registration of adjacent pixels in the presence of vibrations or scan variations may limit the maximum number of columns N that can be used. The focused spot size is typically less than about 1.0 $\mu$m. For 100 nm pixel size, 0.5 gm spot size at Nyquist sampling, 3.2 gm spot separation with a 32 x 32 spot array, the field size at the objective lens about 100×100 $\mu$m and the sidelobe noise is below 1 grayscale.

Referring to FIG. 2B, in order to obtain perfect readout registration of the image, account must be taken of the fact that there is a time delay between when vertically adjacent pixels are illuminated. This time delay depends on the distance between adjacent columns of light spots and the scan speed. The detector array elements 73 receive light imaged from corresponding light spots 31 on the object. Thus, there is an N×M array of detector elements 73. The read-out sequence is in the opposite direction to the scan direction so that if the scan direction of the array of light spots 31 over the object is generally from left to right, the read-out direction for each row of detector elements 73 is from right to left. The scan speed is adjusted relative to the read-out rate of the detector array so that the acquisition time delay for adjacent pixels is precisely compensated. The scan velocity and pixel size determine the required readout time window for each detector element of the array and the maximum time delay between adjacent pixels in the image. In addition, the length of the sampling window in conjunction with the stage velocity determines the amount of image blurring induced by the sampling process. For 100 nm pixel size and 40 mm/sec scan velocity, the maximum acquisition time delay for spots from different rows with the above 32×32 array is 2.5 ms. As a result, vibrational displacements on this time scale and above need to be minimized to reduce vibration-induced image noise. For the 32×32 spot array with a scan velocity of 40 mm/sec at 100 nm pixels, the frame rate is 2.5 $\mu$sec and a total data rate of about 400 Mega pixels per second results. The data rate for each row of 32 active elements is about 12.5 Mhz in the above example, which is well within range of current technology for high speed image sensors. From the above, the potential of scaling the present invention to ultra high data rates in the multi Ghz range can be readily seen. The detector array produces the image signals for the pixels of the spot array which are assembled to the whole image by the read out electronics.

Figure 3:
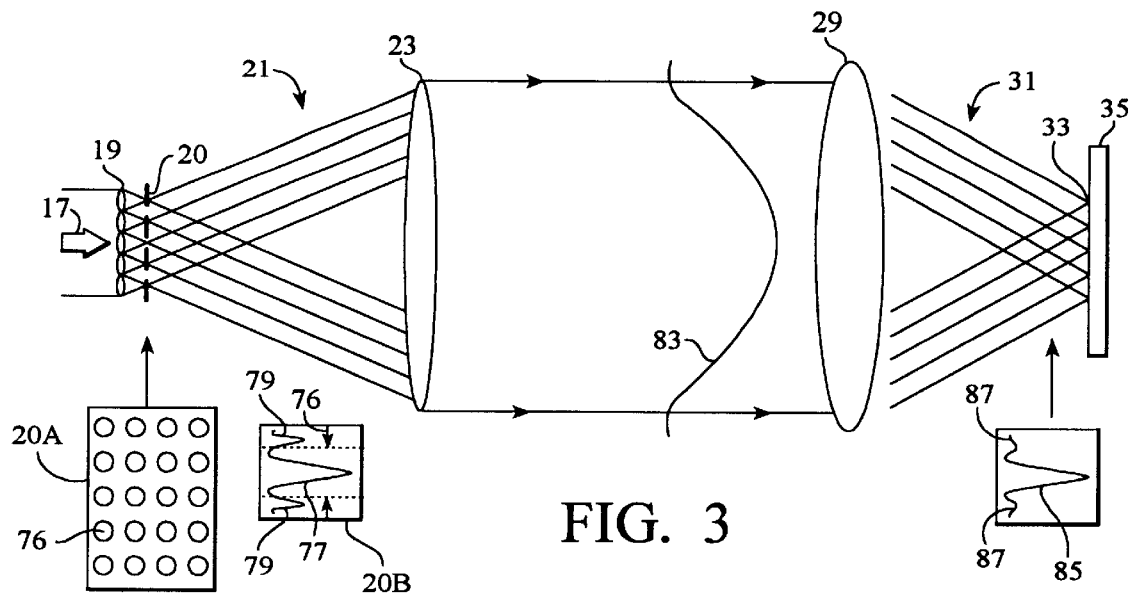
FIG. 3 is a plan view of the illumination optics of FIG. 1 illustrating an apodization technique using spatial filtering by a pinhole array and underfilling of the objective pupil.
Figure 4:
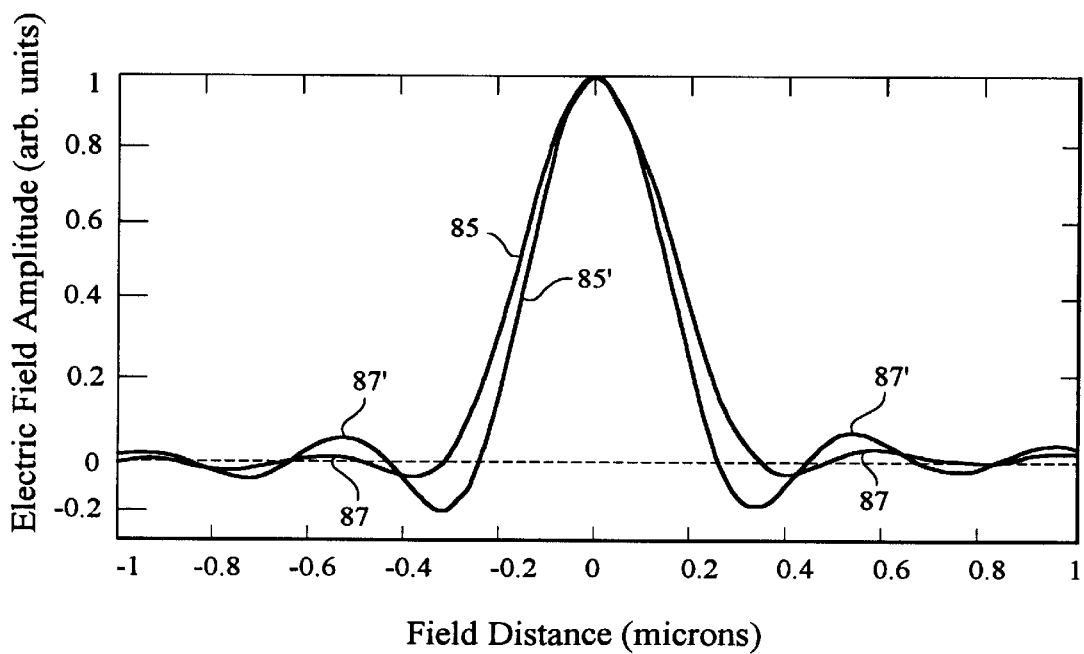
FIG. 4 is a graph of electric field amplitude versus field distance from spot centers of light spot point spread functions with and without apodization by the optics of FIG. 3, illustrating reduction of sidelobes.

With reference to FIGS. 3 and 4, in order to minimize crosstalk between adjacent light spots and speckle from coherent interaction between the spots when a laser light source is used, the individual beamlets should be apodized to minimize their sidelobes. The laser light 17 is divided into separate beamlets by a lens array 19. A spatial filter array, i.e. a pinhole array, 20 with apertures 76 corresponding to the individual lenslets of the lens array 19 is positioned at a focal plane of the lens array 19. The individual apertures 76 allow transmission of the strong central lobe 77 of the beamlets while cutting off transmission of most of the first sidelobes 79 of the beamlets. It is found that when the size of the pinhole apertures 76 is such as to truncate the light about halfway between the Airy disk and the first sidelobe maximum, then the sidelobes on the object are lowest. The apodized light is passed through a collimation lens 23 and an objective lens 29. It is found that sidelobes on the object are minimized when the objective lens' 29 aperture is underfilled. The underfill is illustrated by the intensity profile 83 of the light, where the $1/e^2$ intensity position is well within the aperture of the system. The objective lens 29 focuses the light 31 to separate individual light spots 33 on the object 35. FIG. 4 shows that the intensity profile of each apodized spot is characterized by a strong central disk 85 surrounded by reduced sidelobes 87. In contrast, an unapodized spot would again have an Airy-type point spread function characterized by stronger sidelobes 87' surrounding the central disk 85'. Apodization reduces sidelobe interference between neighboring spots and the associated image noise is therefore also reduced for a given spot separation. Alternatively, for a given acceptable noise level, a smaller spot separation becomes possible.

Defocus and wavefront aberrations may also produce image noise and need to be controlled. Both effects produce image blurring and increase the intensity in the sidelobes which leads to crosstalk between adjacent spots. Table I displays the grayscale error introduced by varying focus offsets and active detector element sizes.

Table I:

Crosstalk (in 0–255 grayscales) in center of a 5×5 array of spots (0.5 μm spot size) with 3 μm spot separation as function of defocus and active detector area size:

Rows 0–4 denote detector sizes 0.5, 0.75, 1.0, 1.25, and 1.5 μm.

Columns 0–10 denote defocus Δz=0, 0.2, 0.4, . . . 2.0 μm.

| D = | 0 | 1 | 2 | 3 | 4 | 5 | 6 | 7 | 8 | 9 | 10 |
|---|---|---|---|---|---|---|---|---|---|---|---|
| 0 | 0 | 0 | 0 | 0 | 0 | 0 | 0 | 0 | 0 | 0 | 0 |
| 1 | 0 | 0 | 0 | 0 | 0 | 0 | 0 | 0 | 0.1 | 0.1 | 0.1 |
| 2 | 0 | 0 | 0 | 0 | 0.1 | 0.1 | 0.1 | 0.1 | 0.1 | 0.1 | 0.2 |
| 3 | 0.1 | 0.1 | 0.1 | 0.1 | 0.1 | 0.1 | 0.1 | 0.2 | 0.2 | 0.3 | 0.3 |
| 4 | 0.1 | 0.1 | 0.1 | 0.2 | 0.2 | 0.2 | 0.2 | 0.3 | 0.3 | 0.4 | 0.6 |

With reference to FIGS. 5–9, an autofocus system is included with the multispot illumination and detection optics. FIG. 5 shows such an autofocus scheme for the reflected optical imaging path. A similar scheme for the transmitted optical path will be discussed below with reference to FIG. 11. The autofocus control system of FIG. 5 ensures that each image spot of the object spot array is in focus on the detector array. A lens array 113 divides the light into beamlets as before, except that as seen in FIG. 7 the lens array 113 includes not only the rectangular array 127 of lenslets 129 used for producing the array of spots seen in FIG. 2A, but also a set of additional lenslets 135 at the corners of the array 113, for generating additional light spots 137 or 139 at the perimeter of the field plane. These additional spots are used to generate multiple autofocus signals using the spot size sensing method. The illumination beamlets are collimated by a lens 115 and focused by an objective 117 onto an object 119. The light spot 137 shows a typical location of a spot when in the desired focal plane, while spot 139 shows a typical out of focus spot, that is one whose focal plane does not lie on the object 119. The light from the object is imaged by lenses 121 and 123 onto a detector array 125 shown in FIG. 8. The detector array includes the rectangular array 131 of detector elements 133 corresponding to the lens array 127 and also a set of detector triplets 141 at the corner locations of the detector array 125 corresponding to the lenslets 135.

As seen in FIG. 6, when the light spots are in focus on the object 119, as represented by corner spot 137, the resulting spot 143' on the spot size sensing detectors 141 has an intermediate size. When the light spots are defocused, as represented by corner spot 139 or 137, the resulting image on the corner detectors 141 is a larger or smaller spot size than the intermediate size. FIG. 9 shows a detector triplet 141 made up of elements A, B and C. The detector outputs of edge elements A and C are summed then subtracted from the central detector output of element B. Minimizing this difference servos on the intermediate spot size and ensures tightly focused spots 33 on the object. The focal length of the autofocus lens elements differ from the ones used for image acquisition and generate defocused spots in the field which are offset in focal distance by equal distances from the imaging spot array. If the object is in focus, all autofocus spots on the autofocus detector elements will be defocused by the same distance and will have the same spot size. If the object is out of focus, the spot sizes of one set of autofocus spots will grow while the other set will shrink. As a result, the 3-element autofocus detectors will yield different signals which are used to activate the focus servo and drive the objective lens back to best focus. The equal and opposite defocus scheme is necessary to cancel the effects of object and optics induced aberrations which lead to pattern-induced focus offsets with a single spot. orthogonal orientations of the detector elements are used to avoid most cases of light loss due to pattern diffraction. Autofocus signals from multiple points in the field are used to minimize focus offset in the presence of object tilt. In addition, the autofocus detector elements function as an alignment tool for aligning the detector array to the spot array and controlling the magnification. The magnification of the optical system is determined by the ratio of the detector size and the pixel size and is controlled to avoid crosstalk from neighboring spots on the detector array.

In addition to autofocusing, one might also deliberately adjust the focal plane of the illumination and imaging optics, for example by piezoelectric positioning of the objective lenses 117 and 121 to provide focal depth scanning. The images obtained from different depths can then be combined in a number of ways by conventional image processing techniques to obtain 3-D image information.

Table II shows the results of defocus and spherical aberration for 1×1 μm detectors. Much of the crosstalk can be compensated by adjusting the focus position if the autofocus senses spot size.

Table II:

Crosstalk (in 0–255 grayscales) in center of 5×5 spot array (0.5 μm spot size, apodized) with 3 μm spot separation and 1×1 μm active detector as function of defocus and spherical aberration:
Rows 0–8 display spherical aberration 0, 0.25, 0.5, . . . 2.0 waves.
Columns 0–20 display defocus Δz=−4.0, −3.6, −3.2, . . . 3.6, 4.0 μm.

| I = | 0 | 1 | 2 | 3 | 4 | 5 | 6 | 7 | 8 | 9 | 10 |
|---|---|---|---|---|---|---|---|---|---|---|---|
| 0 | 6.1 | 3.3 | 1.6 | 0.7 | 0.3 | 0.2 | 0.1 | 0.1 | 0.1 | 0 | 0 |
| 1 | 8.9 | 5.8 | 3.2 | 1.6 | 0.8 | 0.4 | 0.2 | 0.1 | 0.1 | 0.1 | 0 |
| 2 | 10.8 | 8.4 | 5.5 | 3.1 | 1.6 | 0.8 | 0.4 | 0.2 | 0.1 | 0.1 | 0.1 |
| 3 | 11.1 | 10.2 | 7.9 | 5.2 | 3.1 | 1.6 | 0.8 | 0.4 | 0.2 | 0.1 | 0.1 |
| 4 | 10.2 | 10.6 | 9.7 | 7.5 | 5.1 | 3 | 1.6 | 0.8 | 0.4 | 0.2 | 0.1 |
| 5 | 9.1 | 9.8 | 10.1 | 9.2 | 7.2 | 4.9 | 3 | 1.7 | 0.9 | 0.5 | 0.3 |
| 6 | 9.1 | 8.7 | 9.4 | 9.7 | 8.8 | 6.9 | 4.8 | 2.9 | 1.7 | 0.9 | 0.5 |
| 7 | 10.5 | 8.6 | 8.3 | 9 | 9.3 | 8.4 | 6.7 | 4.7 | 2.9 | 1.7 | 0.9 |
| 8 | 12.8 | 9.9 | 8.1 | 8 | 8.7 | 8.9 | 8.1 | 6.5 | 4.6 | 2.9 | 1.7 |

| I = | 11 | 12 | 13 | 14 | 15 | 16 | 17 | 18 | 19 | 20 |
|---|---|---|---|---|---|---|---|---|---|---|
| 0 | 0 | 0.1 | 0.1 | 0.1 | 0.2 | 0.3 | 0.7 | 1.6 | 3.3 | 6.1 |
| 1 | 0 | 0 | 0 | 0.1 | 0.1 | 0.2 | 0.3 | 0.7 | 1.6 | 3.5 |
| 2 | 0 | 0 | 0 | 0 | 0.1 | 0.1 | 0.1 | 0.3 | 0.7 | 1.7 |
| 3 | 0.1 | 0 | 0 | 0 | 0 | 0.1 | 0.1 | 0.1 | 0.3 | 0.7 |
| 4 | 0.1 | 0.1 | 0 | 0 | 0 | 0 | 0.1 | 0.1 | 0.1 | 0.2 |
| 5 | 0.1 | 0.1 | 0.1 | 0 | 0 | 0 | 0 | 0.1 | 0.1 | 0.1 |
| 6 | 0.3 | 0.2 | 0.1 | 0.1 | 0.1 | 0 | 0 | 0 | 0 | 0.1 |
| 7 | 0.5 | 0.3 | 0.2 | 0.1 | 0.1 | 0.1 | 0 | 0 | 0 | 0 |
| 8 | 1 | 0.5 | 0.3 | 0.2 | 0.1 | 0.1 | 0.1 | 0 | 0 | 0 |

Figure 10A:
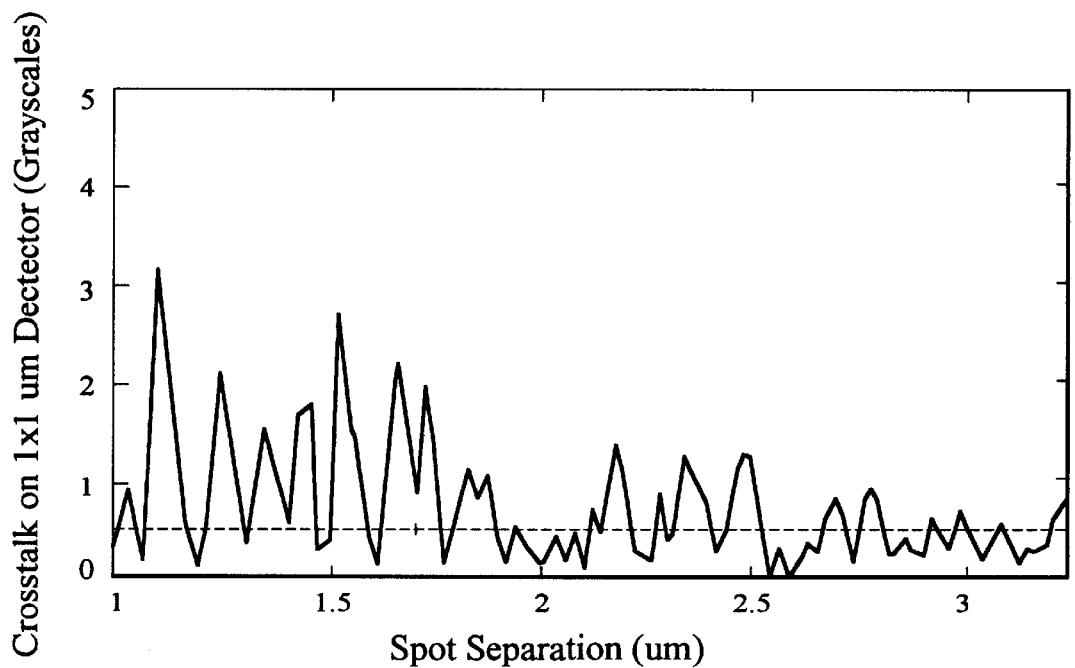
FIGS. 10A and 10B are graphs of sidelobe crosstalk noise intensity (in 0–255 grayscales) on a 1×1 gm detector element from the sidelobe interference of the 48 nearest neighboring spots (apodized point spread function of FIG. 5) as a function of spot spacing (in µm) in the spot array, using conventional imaging for both (a) a flat phase object, and (b) a random phase object, respectively.
Figure 10B:
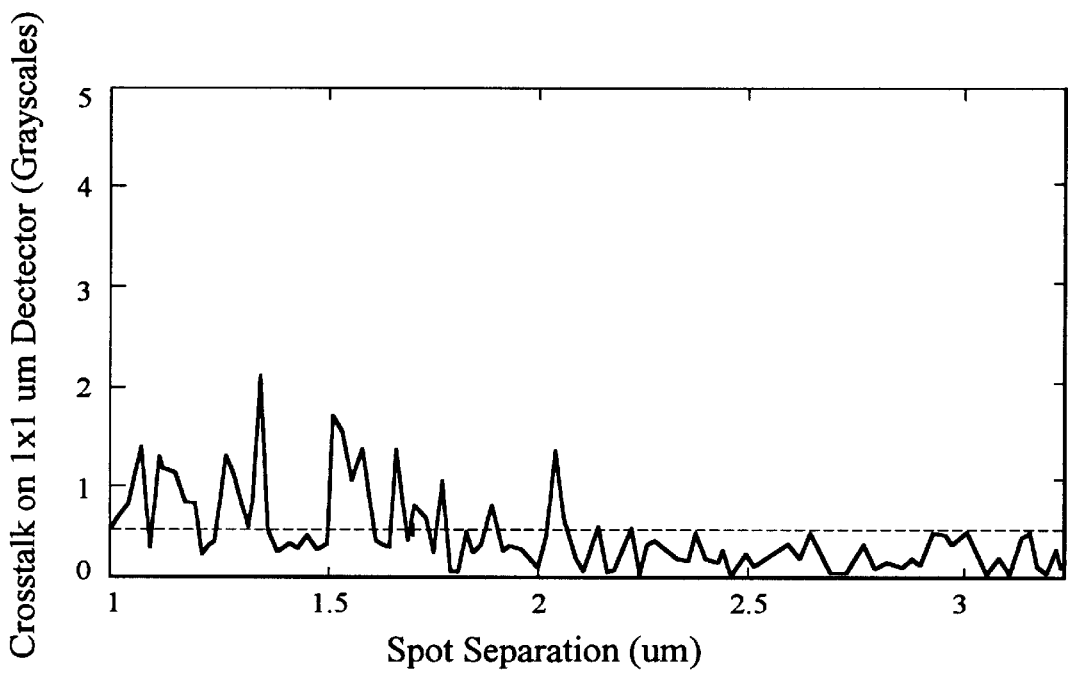

As noted previously, the minimum spot separation d is determined by sidelobe noise in the image. FIGS. 10A–10B show the sidelobe noise in (0–255) grayscales as a function of spot separation for the above-described apodized point spread function (spot size 0.5 μm for 250 nm light with 0.7 NA, FIG. 4) and active detector elements of sizes corresponding to ×11 μm in object space coordinates. The sidelobe noise is below 1 grayscale around 2.0 μm and above 2.5 gm spot separation. Please note that most of the sidelobe noise can be eliminated by light calibration if the light calibration optical path is identical to the imaging path.

Figure 11:
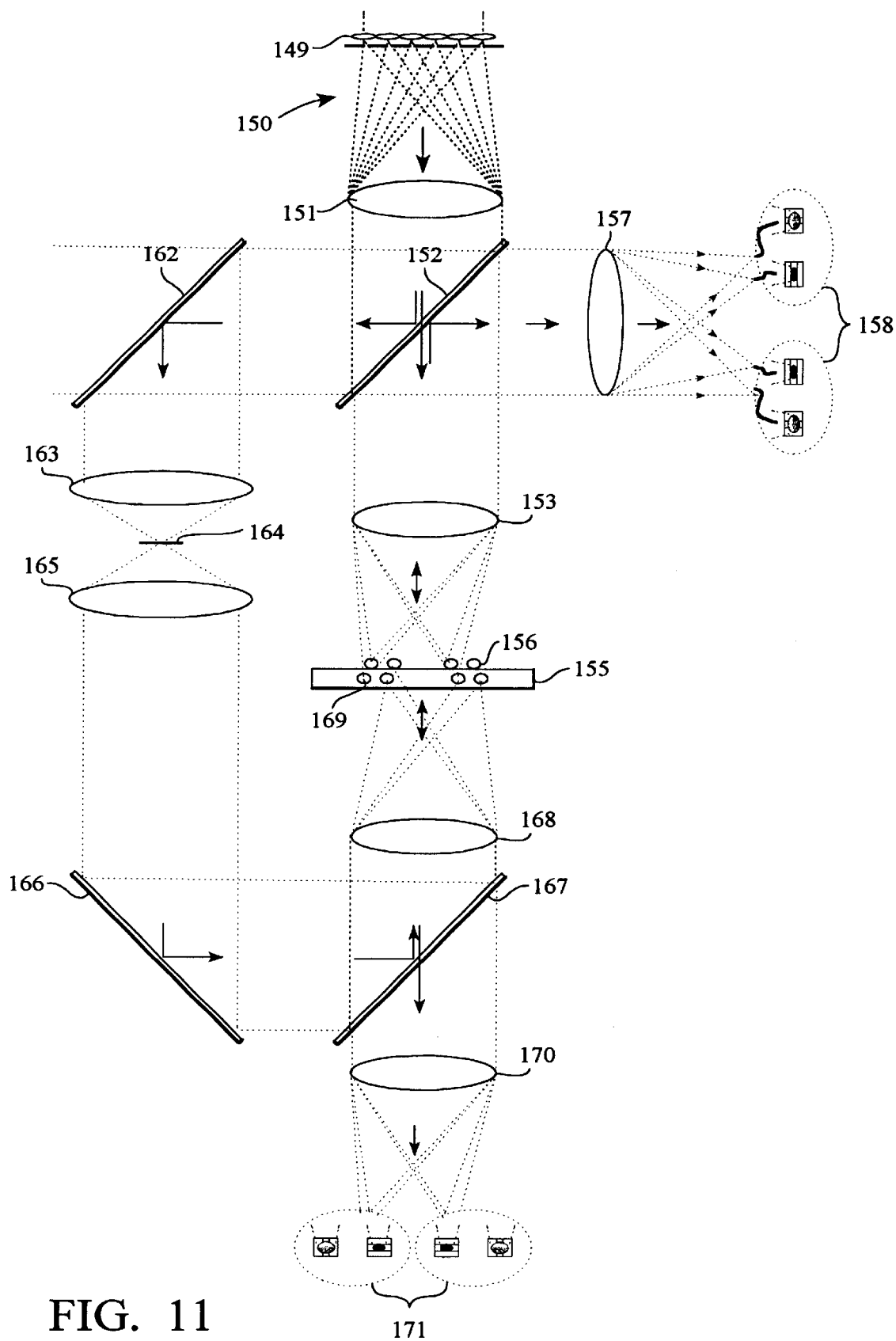
FIG. 11 is a schematic view of a transmitted and reflected light autofocus system for simultaneous operation.
Figure 12:
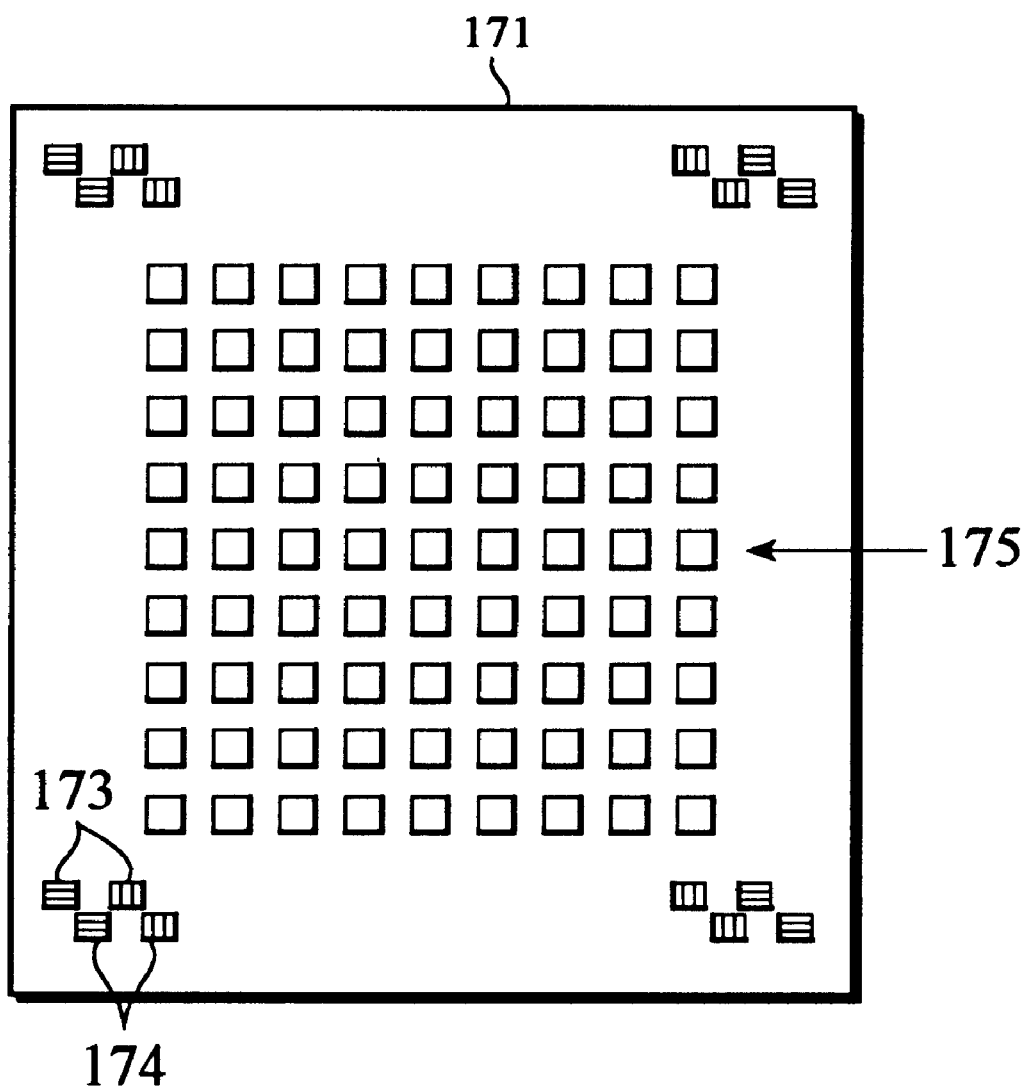
FIG. 12 is a plan view of a transmitted light detector array for the system of FIG. 11 with spot size sensing autofocus elements at the corners. The lens array and reflected light detector array in the system of FIG. 11 are identical to those shown in FIGS. 7 and 8.

With reference to FIGS. 11 and 12, an autofocus system similar to the reflected light autofocus of FIGS. 5–9 is used in the transmitted light path. Again a lens array 149 divides the light into beamlets. This lens array 149 is identical to that seen in FIG. 7, which as previously described includes a set of autofocus lenslets at the corners of the main lenslet array to produce light spots 156 and 167 at the perimeter of the object field especially for use in autofocus control. The illumination beamlets 150 are collimated by collimation lens 151, and then partially transmitted and partially reflected by the beamsplitter 152. The transmitted light is focused onto the object by objective lens 153 to form the usual light spot array. The reflected light autofocus portion works as before, with autofocus spots 156 being imaged by lens 157 onto detector array elements 158 identical to elements 141 in FIG. 8. For transparent objects 155, the defocused autofocus spots 156 generated by the lens array are imaged on one set of transmitted light autofocus detector elements 174 located at equal positions on the transmitted light array sensor 171 (FIG. 12) as on the reflected light array. The autofocus signals are then amplified and used to energize the transmitted light objective focus actuator. As a result, the transmitted light image plane in the transparent object is locked to the reflected light image plane.

If the object 155 is not transparent or the pattern density on the photomask is too high for this approach, a transmitted path autofocus using a reflected light autofocus signal is implemented as follows. A nearly collimated autofocus beam is split off, i.e., reflected by the beamsplitter 152, before the reference detector array. This beam is folded by mirrors 162 and 166 and focused by a lens 163 to an intermediate field plane where a field stop 164 blocks the spots used for image acquisition and passes only the autofocus spots. It is then recollimated by a lens 165 and coupled into the collimated transmitted light imaging path using a 10% beamsplitter 167. As a result the transmitted light objective 168 generates autofocus spots 169 with equal and opposite defocus with respect to the field plane. When imaging the light reflected from these spots by the chrome side of the photomask 155 to a second set of autofocus detector elements 173 on the transmitted light array sensor 171 (FIG. 12), a transmitted path autofocus signal is generated. The transmitted path autofocus spots have to be aligned with the respective autofocus detector elements 173. Both transmitted light path autofocus schemes image through the substrate of the photomask 155 and largely eliminate the effect of residual plate thickness variations. The transmitted light detector array 171 also includes a main detector array 175 for imaging the object.

In addition to autofocusing, a deliberately defocused image can be used to obtain phase information about an object. For example, both focused and defocused image information can be subtracted during data processing in order to obtain a measure of the phase angle for each pixel.

Figure 13:
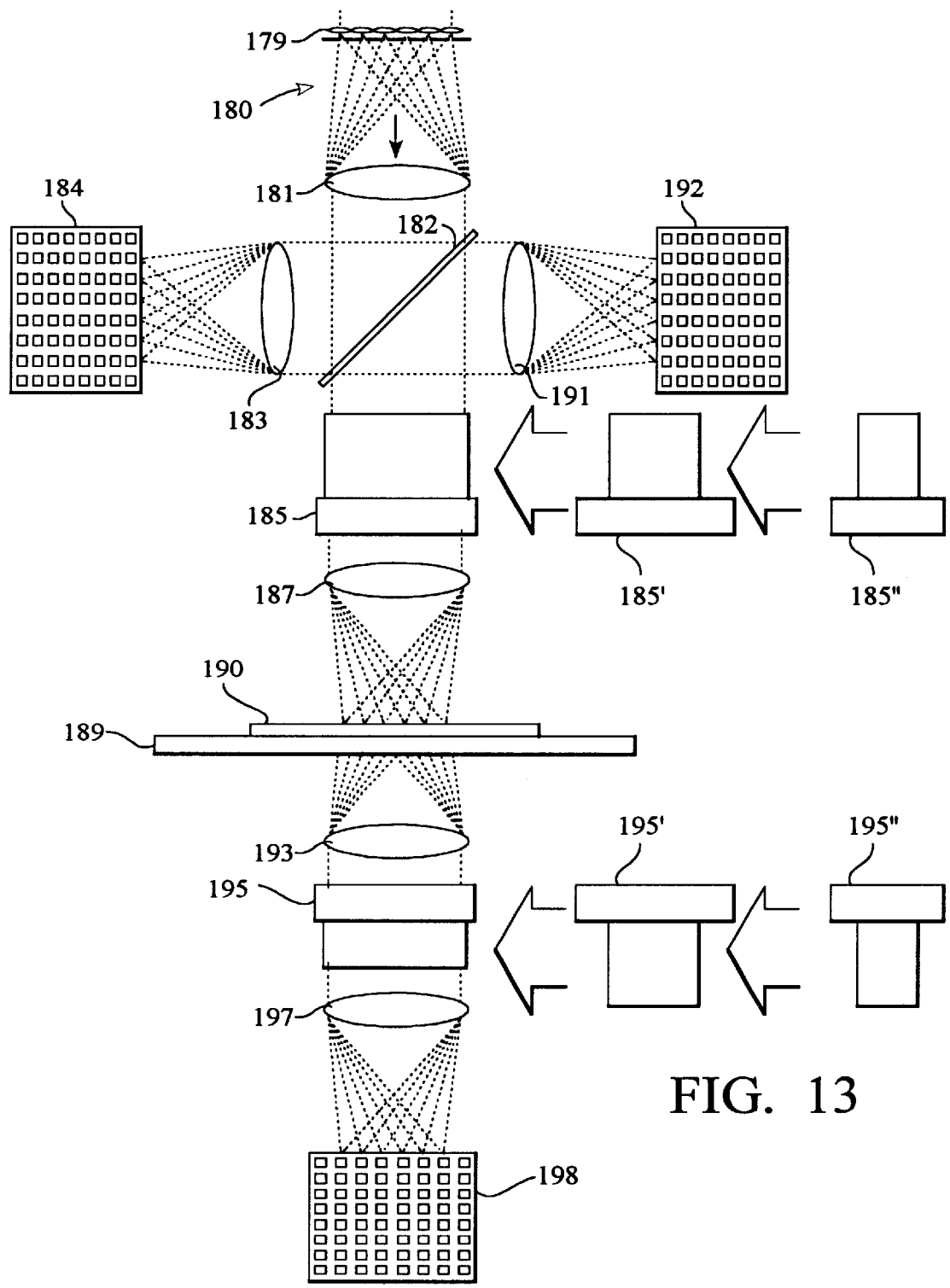
FIG. 13 is a schematic view of an optical system of the present invention augmented to allow changes in magnification and pixel size.

With reference to FIG. 13, pixel sizes can be varied in the transmitted and reflected imaging paths by changing the magnifications from the spot array to the detectors. This is accomplished by inserting different telescopes in the collimated paths or using zoom lenses. Again, a beam is divided by a lens array 179 into separate beamlets 180, preferably apodized. The light 180 is then collimated by a lens 181 and directed through a beamsplitter 182. A portion of this collimated beamlet light is reflected by the beamsplitter 182 toward a reference detector array 184 and imaged thereon by lens 183 for monitoring light output. The light transmitted through the beamsplitter 182 passes through a telescopic lens system 185, which might be a zoom system or turret system with multiple objectives 185, 185' and 185". The beamlets are focused by the objective lens 187 to individual light spots on an object 190 positioned on a movable stage 189. The illuminated object can be imaged in reflection back through the objective lens 187 and telescope system 185 to the beamsplitter 182 where it is reflected and focused by a lens 191 onto a detector array 192. Alternatively the illuminated object can be imaged in transmission through a second objective lens 193 and corresponding telescope system 195, which again can be a turret system with multiple elements 195, 195' and 195" like that shown for the illumination path or a zoom system as shown. The light is imaged by the lens 197 onto a detector array 198. The autofocus resolution will scale with the depth of focus for different magnifications.

Figure 14:
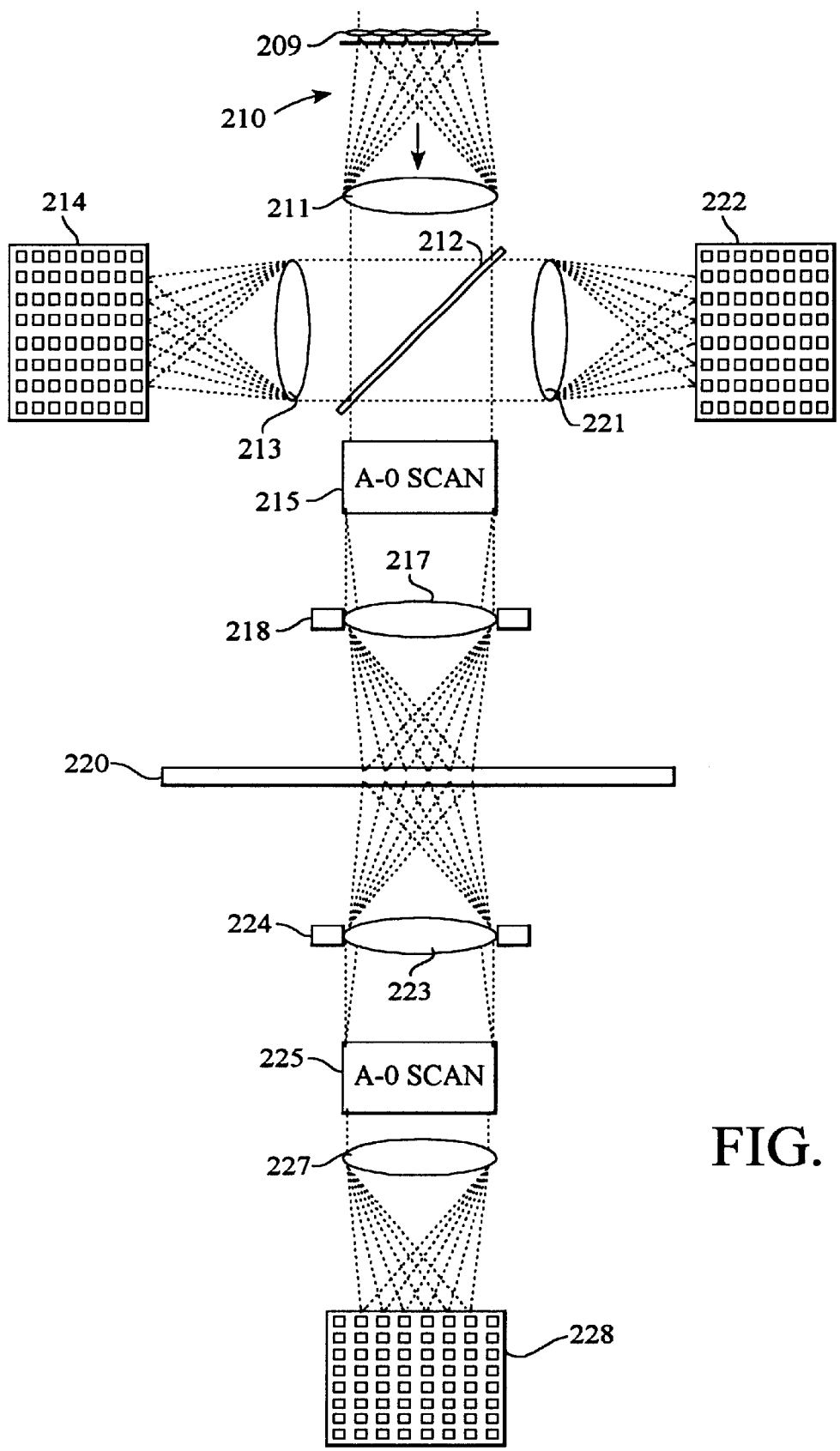
FIG. 14 is a schematic view of an optical system of the present invention augmented to include acousto-optic scanners for real time viewing of stationary objects.

With reference to FIG. 14, high speed video scanning of a stationary object 220 is performed by insertion of acousto-optic beam deflectors (chirp cells 215 and 225) in the reflected and transmitted light collimated beam paths at pupil plane locations. Again the beam is divided into separate beamlets 210 by a lens array 209, preferably with an apodizing pinhole array. The light 210 is then collimated by a lens 211 and directed through a beamsplitter 212. A portion of this collimated beamlet light is reflected by the beamsplitter 212 toward a reference detector array 214 and imaged thereon by lens 213 for monitoring light output. The light transmitted through the beamsplitter 212 passes through an acousto-optic scanning cell 215. Such cells are known and described for example in "Optical Scanning"

edited by Gerald F. Marshall, Chapter 11 (Acousto-optic Scanners and Modulators)(Marcel Dekker, 1991). When a linear increasing frequency is applied by the driver of the chirp cell, a phase grating with pitch increasing in the time domain is set up and a continuous angle scan (spatial frequency domain) of each collimated beam of the angular array is produced according to the Bragg condition. This yields a linear scan of the spot array across the object (spatial domain). At a high frequency cutoff, the driver signal is set to zero to allow for dissipation of the acoustic energy in the chirp cell and resetting of the spots before initiation of the next scan. The beamlets are focused by the objective lens 217 to individual light spots on an object 220. The illuminated object can be imaged in reflection back through the objective lens 217 and acousto-optic scanner 215 to the beamsplitter 212 where it is reflected and focused by a lens 221 onto a detector array 222. Alternatively the illuminated object can be imaged in transmission through a second objective lens 223 and matching acousto-optic scanner 225 synchronized with the first. The light is imaged by the lens 222 onto a detector array 228.

3-Dimensional video scanning for conventional imaging or confocal imaging is accomplished by synchronizing the spatial domain scanning with stepping through different focal positions using piezoelectric focus actuators 218 and 224 for the objective lenses. As a result, image slices from different depths in transmitted and reflected light are produced for real-time 3-D viewing of lithographic process window information, confocal images, or defects.

Figure 15:
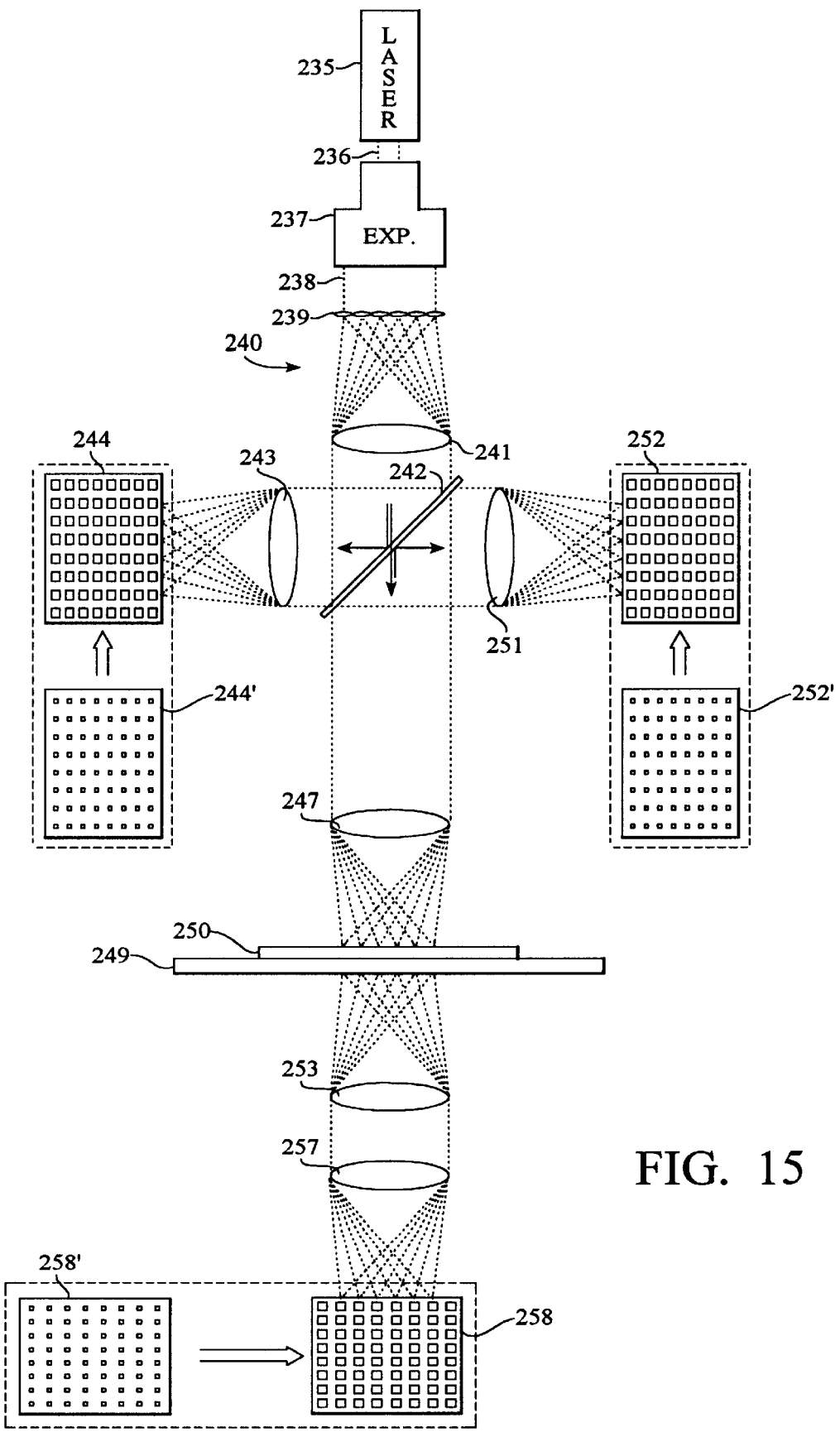
FIG. 15 is a schematic view of an optical system of the present invention augmented to allow both confocal and conventional imaging.

With reference to FIG. 15, the present invention functions as a highly efficient confocal imaging system if array detectors with active areas smaller than the main lobe of the point spread function are used. Conversion between conventional and confocal imaging is accomplished by exchanging array detectors 244, 252, 258 with others 244', 252', 258' having different active area size or by inserting a pinhole array in front of conventional (large active area) detectors. As in previous embodiments, a laser 235 directs a beam 236 through an expander 237 to generate a bright expanded beam 238. The beam 238 is divided into separate beamlets 240 by a lens array 239 with or without an apodizing pinhole array. The light 240 is then collimated by a lens 241 and directed through a beamsplitter 242. A portion of this collimated beamlet light is reflected by the beamsplitter 242 toward a reference detector array 244 and imaged thereon by lens 243 for monitoring light output. The light transmitted through the beamsplitter 242 is focused by the objective lens 247 to individual light spots on an object 250 positioned on a movable stage 249. The illuminated object can be imaged in reflection back through the objective lens 247 to the beamsplitter 242 where it is reflected and focused by a lens 251 onto a detector array 252. Alternatively the illuminated object can be imaged in transmission through a second objective lens 253. The light is imaged by the objective 257 onto a detector array 258.

Figure 16A:
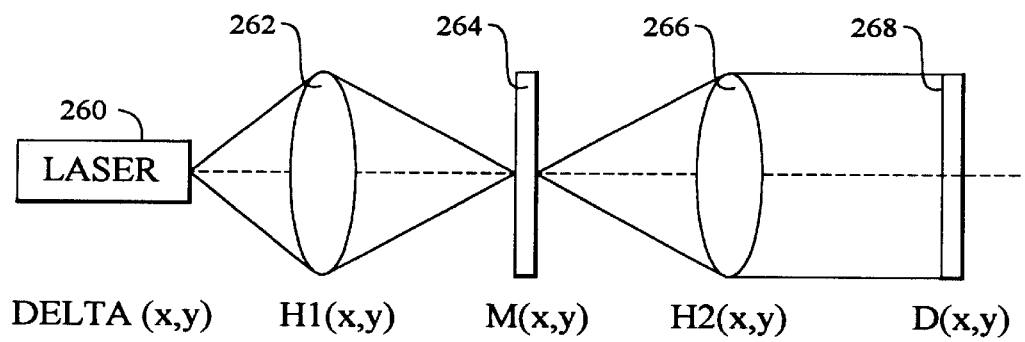
FIGS. 16A and 16B are schematic diagrams of equivalent optical paths for both (a) a conventional imaging scanner, and (b) a confocal imaging scanner.
Figure 16B:
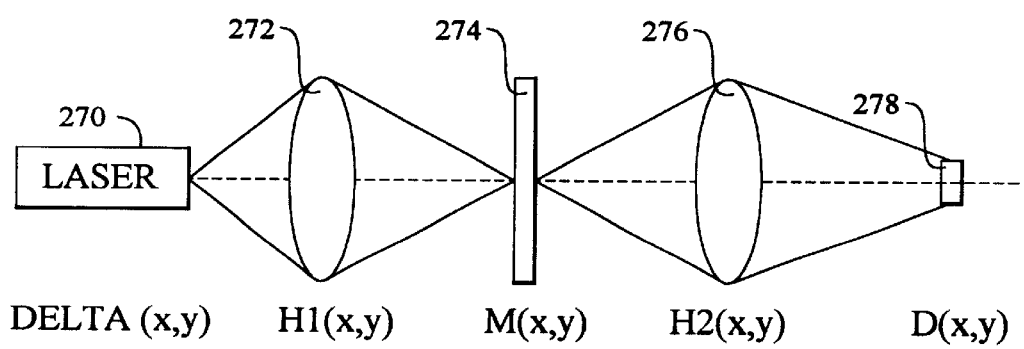

With reference to FIGS. 16A and 16B, the imaging performance of the present invention is described by the following imaging equations. The illumination path 262 or 272 and imaging path 266 or 276 of the optical system for a single spot are represented by optical transfer functions H1 and H2 respectively, as shown in FIGS. 16A and 16B, whereby the coherent laser light source 260 or 270 is represented by a delta function, the phase and amplitude transmission object 264 or 274 is described by a time dependent mask function M(x,y) to account for the scanning, and the active area of the detector 268 or 278 is given by the detector function D(x,y). H2($f_x,f_y$) may differ for reflected or transmitted light imaging. For the conventional microscope imaging mode (FIG. 16A) with detector sizes greater than the point spread function, the detectors 268 collect all light propagating through the pupil and for the sake of simplifying the calculations can be treated as if located at the pupil plane. For the conventional imaging mode, the complex amplitude C.A. in the detector plane is given by $$C.A.(x', y') = H1(x', y') \cdot M(x', y') \otimes H2(x', y')$$
$$= +\int_{-\infty}^{\infty}\int H1(x, y) \cdot M(x, y) \cdot H2(x' - x, y' - y)dxdy$$
$$= F^{-1}[F(H1(x, y) \cdot M(x, y)) \cdot F(H2(x, y))]$$
$$= F^{-1}[F(H1(x, y) \cdot M(x, y)) \cdot Ap2(f_x, f_y)]$$

whereby F denotes the 2-dimensional Fourier transform, the laser 260 has been approximated by a delta function, the convolution theorem was used, Ap2 denotes the aperture function in the pupil plane of the detection optics and $f_x, f_y$ its spatial frequency coordinates. The signal measured by the detector 268 is given by integration of the intensity over the detector area. This yields $$I_{Det} = \int_{Det}\int |C.A.(x', y')|^2 dx' dy'$$
$$= +\int_{-\infty}^{\infty}\int |F^{-1}[F(H1(x, y) \cdot M(x, y)) \cdot Ap2(f_x, f_y)] \cdot Det(x, y)|^2 dxdy$$

where use was made of the detector function D(x,y) defined as unity at the detector active area and zero elsewhere. Again using the convolution theorem and Parseval's theorem gives $$I_{Det} = +\int_{-\infty}^{\infty}\int |F^{-1}[F(H1(x, y) \cdot M(x, y)) \cdot Ap2(f_x, f_y) \otimes F(D(x, y))]|^2$$
$$= +\int_{-\infty}^{\infty}\int |F(H1(x, y) \cdot M(x, y)) \cdot Ap2(f_x, f_y) \otimes F(D(x, y))|^2 df_x df_y$$
$$= +\int_{-\infty}^{\infty}\int |F(H1(x, y) \cdot M(x, y)) \cdot Ap2(f_x, f_y) \otimes H3(f_x, f_y))|^2 df_x df_y$$

In the projector architecture image of a microscope equivalent to the scanner architecture of the present invention, the pupil plane detector would correspond to the size of the incoherent light source and the aperture size thus determines how many incoherent light sources illuminate the image.

In the confocal microscope (FIG. 16B), however, the complex amplitude in the detection optics pupil plane needs to be convolved with the Fourier transform of the detector function H3(x,y) before the measured intensity is determined. Thus for a point detector, H3(x,y)=1, which completely smoothes out any variation of the spectrum from the mask, or in other words, the range of coherence is greater than the aperture at the detection optics pupil plane, i.e. the completely coherent case. For a large detector, H3(x,y)= delta(x,y), i.e. the convolution with the delta function reproduces the complex amplitude in the pupil. The intermediate case of small but finite detector size produces various degrees of smoothing of the spectrum in the detection optics pupil plane resulting in increasing coherence and increasing resolution.

In the last step, the Fourier transform of the detector function was relabeled H3, i.e. the transfer function of an optical system with a clear aperture the size of the detector 278. The intensity measured at the finite size detector of a confocal microscope can now be interpreted as follows: The term on the left side of the convolution symbol is the partially coherent image intensity of the mask M(x,y) that would be measured in a conventional microscope or in a spot scanner with pupil plane detection optics. The point spread function of the illumination path, i.e. H1(x,y) is multiplied by M(x,y) to give the complex amplitude directly behind the mask. This is then Fourier transformed into the pupil plane of the detection optics and multiplied by the detection optics aperture function Ap2(x,y) and all transmitted intensity collected on the pupil plane detector. The complex amplitude incident on the detector is thus the spectrum of spatial frequencies transmitted by the aperture whereby the aperture size determines the partial coherence. The partial coherence in a coherently illuminated spot scanner is given as follows.

The images obtained from scanners and projectors are identical for optically equivalent illumination and detection systems, i.e. the time dependent detector signal in a scanner is identical to the spatial dependence of the image irradiance in a projector if the scanner illumination and collection optics are identical to the projector imaging and illumination optics respectively. This identity also extends to partial coherent imaging. Particularly, a perfectly coherent laser illuminated spot scanner produces partially coherent images with the partial coherence determined by the ratio of the numerical apertures of the detection optics to the illuminating optics. The partial coherence can be adjusted for aerial imaging purposes by placing an iris in the collection optics pupil plane.

Figure 17:
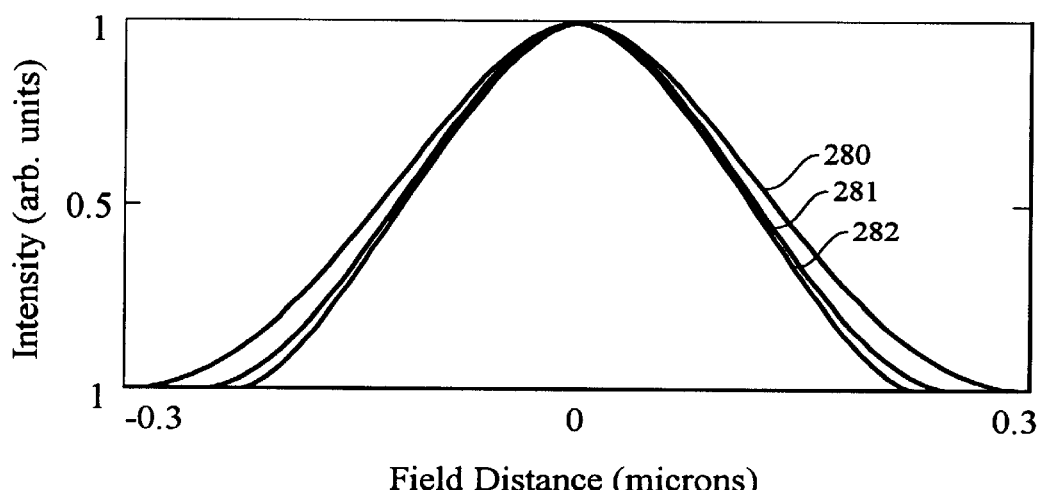
FIG. 17 is a graph of intensity versus field distance of apodized point spread functions, illustrating resolution as a function of detector size (with 1 $\mu$m, 0.25 $\mu$m and 0.13 $\mu$m detectors) for a 0.7 NA objective with 250 nm light.

The detector size dependent resolution of the present invention using the apodized point spread function of the illumination system was calculated by scanning across a subresolution pinhole object with the results displayed in FIG. 17. As the detector size decreases, the resolution increases significantly, from a point spread function represented by curve 280 for a 1 $\mu$m detector, to curve 281 for a 0.25 $\mu$m detector, and curve 282 for a 0.13 $\mu$m detector. In addition, the sidelobes decrease (not shown) as predicted by the imaging equations. Both effects can be seen by calculating the complex amplitude for the point detector case. Using the scanning property of the mask, the even symmetry of the transfer function, and a substitution shifting x and y, Sheppard and Wilson (SPIE, 232, 197(1980)) have shown that the complex amplitude at the detector of an ideal confocal microscope is given by $$C.A.(x', y')=H1(x', y')\cdot H2(x', y')\otimes M(x', y')$$

Thus the object is convolved with the product of the illumination and detection optics point spread functions which leads to higher resolution and reduced sidelobes, when H1=H2.

Figure 18A:
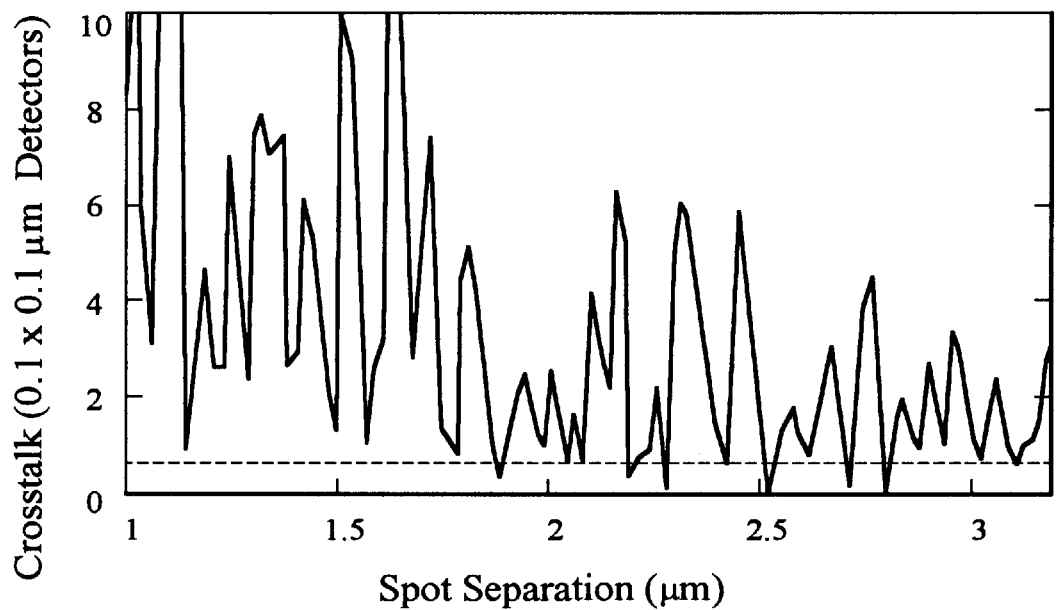
FIGS. 18A and 18B are graphs of sidelobe crosstalk noise intensity (in 0–255 grayscales) from the 48 nearest neighboring spots versus spot spacing (in $\mu$m) for a flat phase object, as in FIG. 10A, but with confocal imaging, using both (a) 0.1×0.1 $\mu$m detector elements and (b) 0.25×0.25 $\mu$m detector elements in the detector array.
Figure 18B:
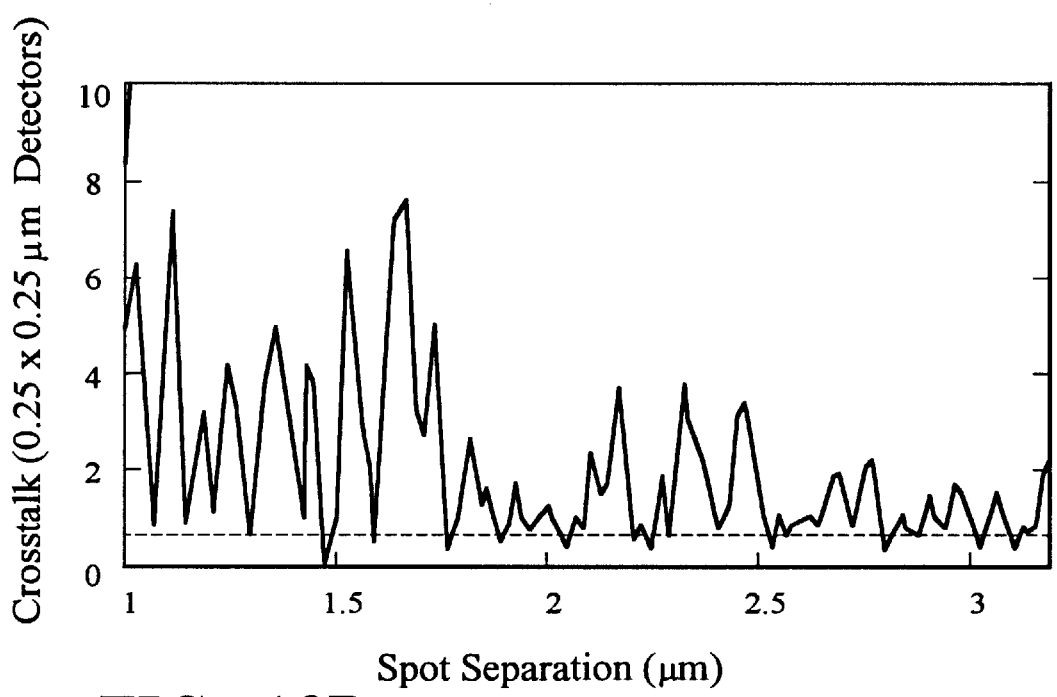

Sidelobe intensities in the confocal array imaging mode were calculated for the above apodized 0.5 gm point spread function and 0.1×0.1 $\mu$m detectors (in object plane coordinates) as a function of spot separation with the results shown in FIGS. 18A and 18B. Sidelobe noise is found to be about 4× greater in the confocal case as compared to the conventional case. As less energy is collected by the small confocal imaging detectors, normalization to 255 grayscales results in a net increase in sidelobe noise in spite of lower sidelobe intensity.

The array detector needs to have active areas that are read out simultaneously and must not be sensitive to the laser light in the regions in between. Sensors operating at high speed are commercially available for visible light and need to be custom ordered for sensitivity in the UV. They typically use an interline transfer architecture (also used in camcorders) whereby the light falling on an active area generates photo-electrons which are moved to a CCD-shift register and shifted to an output amplifier where they are read out. For a typical camera application, a tradeoff exists between the photo active area which contributes to the sensitivity of the sensor and the inactive area used to accommodate the shift registers for readout. For sensitivity, a large active area is desirable while for dynamic range and high speed, a large area needs to be allocated to the shift registers. At high frame rates, the distance between active areas is also limited by the clock speeds of the shift register. In the present invention, this compromise is largely eliminated by the spot array image acquisition which leaves large areas for readout lines and facilitates high speed image sensor design. The scanning architecture of the present invention also closely matches the required readout architecture of the image sensor. High speed array sensor operation requires the active element spacing to be below about 50 $\mu$m.

Power density and thermal damage to the object or the detectors is often a concern with laser scanning systems and a known problem with most prior art confocal scanning microscopes. The highly parallel array architecture of the present invention is very efficient and avoids this problem.

What is claimed is:

1. An optical system for acquiring an image of an object, comprising:
   illumination means for providing an array of multiple separate light spots focused to a focal plane such that each light spot in the array is at substantially the same controlled depth position with respect to said object;
   means for scanning at least the relative lateral position between the array of spots and said object so as to cover a field of said object in a swath of pixels;
   imaging and detecting means, including an array detector, for collecting and detecting light from said object in parallel detection channels for each spot of said spot array; and
   means for processing pixel data received from said array detector so as to construct an image of said field of said object.

2. The system of claim 1 wherein said illumination means comprises a bright light source producing a light beam, means for separating said light beam into multiple individual beamlets, and an objective lens for focusing said individual beamlets into said array of light spots at said object.

3. The system of claim 2 wherein said bright light source comprises a laser with an output thereof optically coupled to a beam expander.

4. The system of claim 2 wherein said beam separating means comprises a pinhole array.

5. The system of claim 2 wherein said beam separating means comprises a microlens array.

6. The system of claim 2 wherein said illumination means further comprises means for apodizing said individual beamlets such that said focused light spots have reduced sidelobes.

7. The system of claim 6 wherein said apodizing means comprises a pinhole array located at a lens array focal plane, said pinhole array having apertures corresponding to individual lenslets of a lens array constituting said beam separating means.

8. The system of claim 6 wherein the pupil of said objective lens is underfilled by said beamlets.

9. The system of claim 1 wherein said scanning means comprises a mechanical stage supporting and moving said object relative to said array of spots.

10. The system of claim 1 wherein said scanning means comprises an acousto-optic chirp cell scanning said array of spots relative to said object.

11. The system of claim 1 wherein said scanning means includes means for adjusting a focal plane of said illumination means and of said imaging and detecting means to additionally provide focal depth scanning of said object.

12. The system of claim 1 further comprising autofocus means for both said illumination means and said imaging and detecting means to maintain said array of spots on said object and to also maintain the image of said object in focus on said array detector.

13. The system of claim 1 wherein said array detector has an array of detector elements that are sized smaller than a point spread function for each collected spot for confocal imaging of said object for each spot of said array of light spots on said object.

14. The system of claim 13 wherein said array detector has detector elements with active areas smaller than said point spread function.

15. The system of claim 13 wherein said array detector has a pinhole aperture array disposed in front of said detector elements with aperture sizes smaller than said point spread function.

16. The system of claim 13 wherein said array detector and said light spots provided by said illumination means are deliberately defocused, whereby a higher resolution image can be constructed by said processing means at the expense of increased sidelobe noise.

17. The system of claim 1 wherein said imaging and detecting means comprises first imaging optics and a first array detector in a reflected light path from said object and second imaging optics and a second array detector in a transmitted light path from said object.

18. The system of claim 1 further comprising optical means in the illumination and light collection paths for adjusting magnification and pixel size for said array of spots on said object.

19. The system of claim 1 wherein said scanning means includes skew means for adjusting a scan angle relative to a row of light spots of said array.

20. The system of claim 1 wherein said array detector has an interline transfer architecture.

21. An optical system for imaging and metrology of an object, comprising:
   means for generating an array of light spots focused to a first focal plane;
   means at said focal plane for truncating sidelobes of each light spot in said array;
   means for focusing each light spot in said array with truncated sidelobes to a second focal plane such that each light spot in the array is at substantially the same controlled depth position with respect to an object;
   means for scanning at least the relative lateral position between the array of spots and said object in a swath of spatial positions covering a field of said object;
   light collection and detection means, including an array detector, for collecting light from each spot on said object onto a separate detector element of said array detector; and
   data processing means, receiving optical detection data from said array detector, for spatially measuring at least one selected property of said object within said field.

22. The system of claim 21 wherein said light spot array generating means comprises a bright light source producing a light beam and means for separating said light beam into multiple individual beamlets focused to said first focal plane.

23. The system of claim 22 wherein said bright light source comprises a laser with an output thereof optically coupled to a beam expander.

24. The system of claim 22 wherein said light beam separating means comprises a microlens array.

25. The system of claim 21 wherein said sidelobe truncating means comprises a pinhole aperture array with pinhole apertures corresponding spatially to said array of light spots.

26. The system of claim 21 wherein said focusing means comprises an objective lens imaging said first focal plane onto said second focal plane.

27. The system of claim 26 wherein the pupil of said objective lens is underfilled by said beamlets.

28. The system of claim 21 wherein said scanning means comprises a mechanical stage supporting and moving said object relative to said array of spots.

29. The system of claim 21 wherein said scanning means comprises an acousto-optic chirp cell scanning said array of spots relative to said object.

30. The system of claim 21 wherein said scanning means includes means for adjusting a focal plane of said illumination means and of said imaging and detecting means to additionally provide focal depth scanning of said object.

31. The system of claim 21 wherein said scanning means includes skew means for adjusting a scan angle relative to a row of light spots of said array.

32. The system of claim 21 further comprising autofocus means for both said focusing means and said light collection and detection means to maintain said array of spots on said object and to also maintain collected light from each spot from the object in focus on said detector elements.

33. The system of claim 21 wherein said detector elements of said array detector are sized smaller than a point spread function for each collected spot for confocal illumination and detection for each spot on said object.

34. The system of claim 33 wherein said array detector has detector elements with active areas smaller than said point spread function.

35. The system of claim 33 wherein said array detector has a pinhole aperture array disposed in front of said detector elements with aperture sizes smaller than said point spread function.

36. The system of claim 21 wherein said array detector has an interline transfer architecture.

37. The system of claim 21 wherein said light collection and detection means includes first imaging optics and a first array detector in a reflected light path from said object and also includes second imaging optics and a second array detector in a transmitted light path from said object.

38. The system of claim 21 further comprising optical means in the illumination and light collection paths for adjusting magnification and pixel size for said array of spots on said object.

39. An optical system for acquiring an image of an object, comprising:
   illumination means, including a coherent light source, for providing an array of coherent light spots focused to a focal plane at a controlled depth position with respect to an object, said illumination means having means for minimizing sidelobe intensity of said spots and minimizing crosstalk between said spots of said array on said object;
   means for scanning at least the relative lateral position between the array of spots and said object so as to cover a field of said object in a swath of pixels;
   light collection means for separately collecting light from each spot from said object, said light collection means characterized by a collection angle selected to establish a partial coherence of the collected light of each spot;

means, including an array detector, for detecting light collected from said object in multiple parallel detection channels, one channel for each spot of said spot array; and processing means, receiving pixel data from said array detector, for constructing an image of said field of said object.

40. The system of claim 39 wherein said coherent light source comprises a laser with an output thereof coupled to a beam expander.

41. The system of claim 39 wherein minimizing means comprises a pinhole aperture array.

42. The system of claim 39 wherein said illumination means includes a microlens array.

43. The system of claim 39 wherein said scanning means comprises a mechanical stage supporting and moving said object relative to said array of spots.

44. The system of claim 39 wherein said scanning means comprises an acousto-optic chirp cell scanning said array of spots relative to said object.

45. The system of claim 39 wherein said scanning means includes means for adjusting a focal plane of said illumination means and of said imaging and detecting means to additionally provide focal depth scanning of said object.

46. The system of claim 39 wherein said scanning means includes skew means for adjusting a scan angle relative to a row of light spots of said array.

47. The system of claim 39 further comprising autofocus means for both said illumination means and said light collection means to maintain said array of spots on said object and to also maintain the collected light in focus on said array detector.

48. The system of claim 39 wherein said array detector has an array of detector elements that are sized smaller than a point spread function for each collected spot for confocal imaging for each spot on the object.

49. The system of claim 48 wherein said array detector has detector elements with active areas smaller than said point spread function.

50. The system of claim 48 wherein said array detector has a pinhole aperture array disposed in front of said detector elements with aperture sizes smaller than said point spread function.

51. The system of claim 39 wherein said array detector has an interline transfer architecture.

52. The system of claim 39 wherein said light collection and detection means includes first imaging optics and a first array detector in a reflected light path from said object and also includes second imaging optics and a second array detector in a transmitted light path from said object.

53. The system of claim 39 further comprising optical means in the illumination and light collection paths for adjusting magnification and pixel size for said array of spots on said object.

54. A confocal imaging system, comprising:
illumination means for providing an array of multiple separate focused light spots to an object, said illumination means including means for minimizing sidelobes for each light spot;
means for imaging and detecting light from said object for each said spot of said spot array, said imaging and detecting means including an array detector having a plurality of detector elements, each of said detector elements having a size smaller than a point spread function for each imaged light spot;
means for at least laterally scanning the relative position between said object and said array of spots; and processing means for constructing an image from pixel data received from said array detector.

55. The system of claim 54 wherein each detector element has an active area smaller than said point spread function.

56. The system of claim 54 wherein said array detector has a pinhole aperture array disposed in front of said detector elements with aperture sizes smaller than said point spread function.

57. The system of claim 54 wherein said scanning means includes means for adjusting a focal plane of said illumination means and said imaging and detecting means to additionally provide focal depth scanning of said object.

58. The system of claim 57 wherein said processing means is for constructing a three-dimensional image from said pixel data.

59. The system of claim 54 wherein said illumination means comprises a bright light source producing a light beam, means for separating said light beam into multiple beamlets and an objective lens for focusing said individual beamlets into said array of light spots of said object.

60. The system of claim 59 wherein said bright light source comprises a laser with an output thereof optically coupled to a beam expander.

61. The system of claim 59 wherein said beam separating means comprises a microlens array.

62. The system of claim 54 wherein said sidelobe minimizing means comprises a pinhole aperture array.

63. The system of claim 54 wherein said scanning means comprises a mechanical stage supporting and moving said object relative to said array of spots.

64. The system of claim 54 wherein said scanning means comprises an acousto-optic chirp cell scanning said array of spots relative to said object.

65. The system of claim 54 wherein said scanning means includes skew means for adjusting a scan angle relative to a row of light spots of said array.

66. The system of claim 54 further comprising autofocus means for both said illumination means and said imaging and detecting means to maintain said array of spots on said object and to also maintain the image of said object in focus on said array detector.

67. The system of claim 54 further comprising optical means in the illumination and light collection paths for adjusting magnification and pixel size for said array of spots on said object.

68. The system of claim 54 wherein said imaging and detecting means comprises first imaging optics and a first array detector in a reflected light path from said object and second imaging optics and a second array detector in a transmitted light path from said object.

69. The system of claim 54 wherein said array detector has an interline transfer architecture.

70. An optical system configured to acquire an image of an object during use, comprising:
a bright light source configured to produce a light beam during use;
a microlens array having multiple individual lenslets in a path of said light beam configured to separate said light beam into multiple individual beamlets focused to a first focal plane during use;
a pinhole array located at said first focal plane of said microlens array and having apertures corresponding to said lenslets, wherein the pinhole array is configured to apodize said individual beamlets during use;
an objective lens positioned to receive said apodized beamlets from said pinhole array, and wherein said objective lens is underfilled by said beamlets, and wherein the objective lens is configured to focus said beamlets into a two-dimensional array of multiple separate light spots at a second focal plane at a controlled depth position with respect to the object during use;

a mechanical stage configured to support said object and to alter a lateral position of said object relative to said array of light spots during use, wherein said stage is further configured to move said object at a scan angle relative to said array of light spots so as to cover a field of said object in a swath of pixels during use;

imaging optics disposed within a light collection path from said object;

at least one array detector positioned to receive light from said imaging optics, wherein at least said one array detector comprises multiple individual detector elements corresponding to each of said light spots on said object, and wherein at least said one array detector is configured to detect light from said object in parallel detection channels during use; and a processor configured to receive pixel data from at least said one array detector during use, and wherein the processor comprises an image computer configured to construct an image from said pixel data during use.

71. The optical system of claim 70, wherein said bright light source comprises a laser optically coupled to a beam expander.

72. The optical system of claim 70, further comprising an acousto-optic cell configured to locally scan said array of spots relative to features of interest on said object during use such that a local field is scanned in a swath of pixels, and wherein the local field comprises the features of interest.

73. The optical system of claim 70, further comprising telescopic optics in the illumination and light collection paths configured to adjust magnification and pixel size for said array of spots on said object during use.

74. The optical system of claim 70, wherein the light collection path comprises a reflected light path from said object.

75. The optical system of claim 70, wherein the light collection path comprises a transmitted light path from said object.

76. The optical system of claim 70, wherein the light collection path comprises reflected and transmitted light paths from said object, the optical system further comprising two said array detectors positioned to receive respective reflected and transmitted light from said imaging optics.

77. The optical system of claim 70, further comprising an autofocus system for both illumination and light collection paths configured to maintain said array of light spots in focus on said object and to maintain collected light from said object in focus on each said array detector.

78. The optical system of claim 70, wherein said detector elements have active areas smaller than a point spread function for each collected spot.

79. The optical system of claim 70, wherein a second pinhole array comprises apertures disposed in front of each detector element, and wherein sizes of said apertures are smaller than a point spread function for each collected spot.

80. The optical system of claim 70, wherein at least said one array detector has an interline transfer architecture.

81. A method of acquiring an image of an object, comprising:

illuminating the object with a two-dimensional array of light spots focused to a focal plane such that each light spot in the array is at substantially the same controlled depth position with respect to the object;

scanning a relative lateral position between the array of spots and the object at a scan angle such that a field of said object is covered with a swath of pixels;

detecting light from the illuminated object in parallel detection channels for each spot of the array of light spots; and processing the detected light to construct an image of the field of the object.

82. The method of claim 81, wherein illuminating the object comprises providing a bright light source, splitting a beam from said light source into multiple beamlets, and focusing said beamlets to said light spots.

83. The method of claim 82, further comprising apodizing said beamlets.

84. The method of claim 81, wherein scanning said relative position comprises laterally moving the object relative to said array of light spots.

85. The method of claim 81, wherein scanning said relative position comprises scanning said array of light spots over a field of interest on said object.

86. The method of claim 81, wherein both illuminating and imaging comprises adjusting a magnification and pixel size for said array of spots on said object.

87. The method of claim 81, wherein the detected light comprises reflected light from said illuminated object.

88. The method of claim 81, wherein the detected light comprises transmitted light from said illuminated object.

89. The method of claim 81, further comprising sensing a focus condition and maintaining said array of light spots in focus on said object and said detected light in focus on said detection channels.

90. The method of claim 81, wherein the image of the field of said object comprises a confocal image.

91. An optical system configured to acquire an image of an object during use, comprising:

an illumination system configured to generate an array of light spots focused to a focal plane such that each light spot in the array is at substantially the same controlled depth position with respect to an object during use;

a scanning device configured to alter at least a relative lateral position between the object and the array of light spots such that the array of light spots is scanned over a field of the object in a swath of pixels during use;

an array detector configured to collect and detect light from the object during use, wherein the array detector comprises a parallel detection channel for each light spot of the array of light spots; and a processor configured to process pixel data received from the array detector and to construct an image of the field of the object from the processed pixel data during use.

92. The system of claim 91, wherein the illumination system comprises a bright light source configured to produce a light beam during use, a beam separator configured to separate the light beam into the array of light spots during use, and an objective lens configured to focus the array of light spots at the object during use.

93. The system of claim 92, wherein the bright light source comprises a laser coupled to a beam expander.

94. The system of claim 92, wherein the beam separator comprises a pinhole array.

95. The system of claim 92, wherein the beam separator comprises a microlens array.

96. The system of claim 91, further comprising an apodization system coupled to the illumination system, wherein the apodization system is configured to suppress sidelobes in each light spot of the array of light spots during use.

97. The system of claim 96, wherein the apodization system comprises a pinhole array located at a lens array focal plane, and wherein the pinhole array comprises apertures corresponding to individual lenslets of a lens array coupled to the illumination system.

98. The system of claim 96, wherein the apodization system comprises a collimation lens, and wherein the collimation lens is underfilled by the array of light spots.

99. The system of claim 91, wherein the scanning device comprises a mechanical stage configured to support and move the object relative to said array of light spots during use.

100. The system of claim 91, wherein the scanning device comprises an acousto-optic chirp cell configured to alter a lateral position of the array of spots relative to said object during use.

101. The system of claim 91, wherein the scanning device is configured to alter a focal plane of the illumination system with respect to the array detector such that the object is scanned at multiple focal plane depths during use.

102. The system of claim 91, further comprising an autofocus system configured to alter a focal plane of the illumination system and the array detector such that the array of light spots is in focus on the object and such that detected the light is in focus on the array detector during use.

103. The system of claim 91, wherein the array detector has an array of detector elements, and wherein the detector elements are sized smaller than a point spread function for each collected light spot to produce a confocal image of the object.

104. The system of claim 103, wherein the detector elements have active areas sized smaller than the point spread function.

105. The system of claim 103, further comprising a pinhole aperture array disposed in front of the array of detector elements having aperture sizes smaller than the point spread function.

106. The system of claim 103, wherein the array detector and the array of light spots generated by the illumination system are deliberately defocused such that the constructed image of the object has a higher resolution and increased sidelobe noise than an image of the object under focused conditions.

107. The system of claim 91, wherein the array detector comprises first imaging optics and a first array detector in a reflected light path from the object and second imaging optics and a second array detector in a transmitted light path from the object.

108. The system of claim 91, further comprising optics configured to adjust magnification and pixel size for the array of light spots on the object during use.

109. The system of claim 91, wherein the scanning device is configured to alter a scan angle relative to a row of light spots of the array of light spots during use.

110. The system of claim 91, wherein the array detector has an interline transfer architecture.

111. An optical system configured to produce an image of an object and to determine at least one property of the object during use, comprising:
  an illumination system configured to generate an array of light spots focused to a first focal plane during use;
  a pinhole aperture array configured to truncate sidelobes of each light spot in the array of light spots during use;
  an objective lens configured to focus the array of light spots having truncated sidelobes to a second focal plane such that each light spot in the array is at substantially the same controlled depth position with respect to the object during use;
  a scanning device configured to alter at least a relative lateral position between the object and the array of light spots such that the array of light spots is scanned over a field of the object in a swath of pixels during use;
  an array detector comprising an array of detector elements, wherein each detector element is configured to collect and detect light from one light spot on the object during use; and
  a processor configured to receive detected light from the array detector and to determine at least one property of the object within the field during use.

112. The system of claim 111, wherein the illumination system comprises a bright light source configured to produce a light beam during use and a beam separator configured to separate the light beam into the array of light spots focused to the first focal plane during use.

113. The system of claim 112, wherein the bright light source comprises a laser optically coupled to a beam expander.

114. The system of claim 112, wherein the beam separator comprises a microlens array.

115. The system of claim 111, wherein the pinhole aperture array comprises pinhole apertures arranged laterally such that each pinhole aperture corresponds to one light spot of the array of light spots.

116. The system of claim 111, wherein the objective lens is underfilled by the array of light spots.

117. The system of claim 111, wherein the scanning device comprises a mechanical stage configured to support and move the object relative to the array of light spots during use.

118. The system of claim 111, wherein the scanning device comprises an acousto-optic chirp cell configured to alter a lateral position of the array of the light spots relative to the object during use.

119. The system of claim 111, wherein the scanning device is configured to alter a focal plane of the illumination system with respect to the array detector such that the object is scanned at multiple focal plane depths during use.

120. The system of claim 111, wherein the scanning device is configured to alter a scan angle relative to a row of light spots of the array of light spots during use.

121. The system of claim 111, further comprising an autofocus system configured to alter a focal plane of the illumination system and the array detector such that the array of light spots is in focus on the object and such that the detected light is in focus on the array detector during use.

122. The system of claim 111, wherein the array detector has an array of detector elements, and wherein the detector elements are sized smaller than a point spread function for each collected light spot to produce a confocal image of the object.

123. The system of claim 122, wherein the detector elements have active areas sized smaller than the point spread function.

124. The system of claim 122, further comprising a pinhole aperture array disposed in front of the array of detector elements having aperture sizes smaller than the point spread function.

125. The system of claim 111, wherein the array detector has an interline transfer architecture.

126. The system of claim 111, wherein the array detector comprises first imaging optics and a first array detector in a reflected light path from the object and second imaging optics and a second array detector in a transmitted light path from the object.

127. The system of claim 111, further comprising optics configured to adjust magnification and pixel size for the array of light spots on the object during use.

128. An optical system configured to produce an image of an object during use, comprising:
- an illumination system configured to provide an array of coherent light spots focused to a focal plane at a controlled depth position with respect to the object during use, to minimize sidelobe intensity of each light spot of the array of coherent light spots during use, and to minimize crosstalk between each spot of the array of coherent light spots on the object during use;
- a scanning device configured to alter at least a relative lateral position between the array of coherent light spots and the object such that the array of coherent light spots is scanned over a field of the object in a swath of pixels during use;
- a light collection device configured to collect light from each spot on the object during use, and wherein the light collection device is positioned at a collection angle such that the light collected from each spot has a partial coherence;
- an array detector configured to detect the collected light in multiple parallel detection channels, wherein each channel is configured to detect light collected from one spot on the object; and
- a processor configured to receive pixel data from the array detector and to construct an image of the field of the object from the received pixel data during use.

129. The system of claim 128, wherein the illumination system comprises a coherent light source, and wherein the coherent light source comprises a laser coupled to a beam expander.

130. The system of claim 128, wherein the illumination system comprises a pinhole aperture array configured to minimize the sidelobe intensity of each light spot of the array of coherent light spots during use and to minimize crosstalk between each spot of the array of coherent light spots on the object during use.

131. The system of claim 128, wherein the illumination system comprises a microlens array.

132. The system of claim 128, wherein the scanning device comprises a mechanical stage configured to support and move the object relative to the array of coherent light spots during use.

133. The system of claim 128, wherein the scanning device comprises an acousto-optic chirp cell configured to alter a lateral position of the array of coherent light spots relative to the object during use.

134. The system of claim 128, wherein the scanning device is configured to alter a focal plane of the illumination system with respect to the array detector such that the object is scanned at multiple focal plane depths during use.

135. The system of claim 128, wherein the scanning device is configured to alter a scan angle relative to a row of light spots of the array of light spots during use.

136. The system of claim 128, further comprising an autofocus system configured to alter a focal plane of the illumination system and the array detector such that the array of coherent light spots is in focus on the object and such that the collected light is in focus on the array detector during use.

137. The system of claim 128, wherein the array detector has an array of detector elements, and wherein the detector elements are sized smaller than a point spread function for each collected light spot to produce a confocal image of the object.

138. The system of claim 137, wherein the detector elements have active areas sized smaller than the point spread function.

139. The system of claim 137, further comprising a pinhole aperture array disposed in front of the array of detector elements having aperture sizes smaller than the point spread function.

140. The system of claim 128, wherein the array detector has an interline transfer architecture.

141. The system of claim 128, wherein the array detector comprises first imaging optics and a first array detector in a reflected light path from the object and second imaging optics and a second array detector in a transmitted light path from the object.

142. The system of claim 128, further comprising optics configured to adjust magnification and pixel size for the array of light spots on the object during use.

143. A confocal imaging system, comprising:
- an illumination system configured to provide an array of focused light spots to an object and to minimize sidelobes for each light spot of the array during use;
- an array detector configured to collect and detect light from the object for each light spot of the array during use, wherein the array detector comprises a plurality of detector elements, and wherein each of the plurality of detector elements has a size smaller than a point spread function for each collected light spot;
- a scanning device configured to alter a relative position between the object and the array of light spots; and
- a processor configured to construct an image of the object from pixel data received from the array detector.

144. The system of claim 143, wherein each of the plurality of detector elements has an active area smaller than the point spread function.

145. The system of claim 143, wherein the array detector has a pinhole aperture array disposed in front of the plurality of detector elements, and wherein each pinhole aperture of the pinhole aperture array has a size smaller than the point spread function.

146. The system of claim 143, wherein the scanning device is configured to alter a focal plane of the illumination system with respect to the array detector such that the object is scanned at multiple focal plane depths during use.

147. The system of claim 143, wherein the processor is further configured to construct a three-dimensional image of the object from the pixel data.

148. The system of claim 143, wherein the illumination system comprises a bright light source configured to produce a light beam, a beam separator configured to separate the light beam into the array of focused light spots, and an objective lens configured to focus each light spot of the array onto the object.

149. The system of claim 148, wherein the bright light source comprises a laser optically coupled to a beam expander.

150. The system of claim 148, wherein the beam separator comprises a microlens array.

151. The system of claim 148, wherein the illumination system comprises a pinhole aperature array configured to minimize sidelobes for each light spot during use.

152. The system of claim 143, wherein the scanning device comprises a mechanical stage configured to support and move the object relative to the array of light spots during use.

153. The system of claim 143, wherein the scanning device comprises an acousto-optic chirp cell configured to alter a lateral position of the array of light spots relative to the object during use.

154. The system of claim 143, wherein the scanning device is configured to alter a scan angle relative to a row of light spots of the array of light spots during use.

155. The system of claim 143, further comprising an autofocus system configured to alter a focal plane of the illumination system and the array detector such that the array of light spots is in focus on the object and such that the collected light is in focus on the plurality of detector elements during use.

156. The system of claim 143, further comprising optics configured to adjust magnification and pixel size for the array of light spots on the object during use.

157. The system of claim 143, wherein the array detector comprises first imaging optics and a first array detector in a reflected light path from the object and second imaging optics and a second array detector in a transmitted light path from the object.

158. The system of claim 143, wherein the array detector has an interline transfer architecture.

* * * * *

UNITED STATES PATENT AND TRADEMARK OFFICE
CERTIFICATE OF CORRECTION

PATENT NO.   : 6,248,988 B1
DATED        : June 19, 2001
INVENTOR(S)  : Matthias C. Krantz It is certified that error appears in the above-identified patent and that said Letters Patent is hereby corrected as shown below:

<u>Column 21, claim 73,</u>
Line 36, please delete "array of spots" and substitute therefor -- array of light spots --.

Signed and Sealed this

Fifteenth Day of January, 2002

Attest:

JAMES E. ROGAN
Attesting Officer    Director of the United States Patent and Trademark Office